US012707408B2

(12) United States Patent
Sayed Hassan et al.

(10) Patent No.: US 12,707,408 B2
(45) Date of Patent: Aug. 11, 2026

(54) PRIORITY-BASED TIMING ADVANCE (TA) ADJUSTMENT

(71) Applicant: QUALCOMM Incorporated, San Diego, CA (US)

(72) Inventors: Mohamad Sayed Hassan, Paris (FR); Lianghai Ji, San Diego, CA (US); Liangping Ma, San Diego, CA (US); Jun Ma, San Diego, CA (US); Qiang Wu, San Diego, CA (US); Huilin Xu, Temecula, CA (US); Weimin Duan, San Diego, CA (US); Mehmet Izzet Gurelli, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 873 days.

(21) Appl. No.: 17/869,277

(22) Filed: Jul. 20, 2022

(65) Prior Publication Data

US 2024/0031963 A1 Jan. 25, 2024

(51) Int. Cl.
*H04W 56/00* (2009.01)
*H04B 17/318* (2015.01)

(52) U.S. Cl.
CPC ...... *H04W 56/0045* (2013.01); *H04B 17/318* (2015.01)

(58) Field of Classification Search
None
See application file for complete search history.

(56) References Cited

U.S. PATENT DOCUMENTS 10,123,311 B1 * 11/2018 Srinivas .............. H04W 52/265
2020/0267692 A1 * 8/2020 Wu ....................... H04W 72/04
2022/0053555 A1 * 2/2022 Chen ................ H04W 56/0045
(Continued)

OTHER PUBLICATIONS

Moderator (Mediatek) : "Summary #4 of AI 8.15.1 Enhancements to time and frequency synchronization", R1-2110550, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 19, 2021, 84 Pages, XP052061615, Section 3 Section 4.
3GPP: "3rd Generation Partnership Project, Technical Specification Group Radio Access Network, NR, Physical Layer Procedures for Data (Release 17)", 3GPP Organizational Partners, Sophia Antipolis Valbonne, France, 3GPP TS 38.214 V17.1.0, Mar. 2022, pp. 1-225.
(Continued)

*Primary Examiner* — Ayman A Abaza
*Assistant Examiner* — Camquyen Thai
(74) *Attorney, Agent, or Firm* — Holland & Hart LLP/ QUALCOMM Incorporated

(57) ABSTRACT

Methods, systems, and devices for wireless communications are described. A user equipment (UE) may receive a message indicating a time domain window (TDW) configuration including a start time of a TDW and a length of the TDW, where the TDW is a duration over which a network entity is scheduled to perform joint channel estimation. The UE may receive a timing advance (TA) command during the TDW indicating a TA value to apply to signaling. The UE may transmit the signaling in accordance with the TA value or independent of the TA value based on the UE prioritizing the TA adjustment or maintaining power consistency and phase continuity for DMRS bundling, respectively. The UE may determine whether to prioritize the TA adjustment or DMRS bundling for the joint channel estimation based on one or more parameters satisfying criteria.

44 Claims, 22 Drawing Sheets

(56) References Cited

U.S. PATENT DOCUMENTS

| | | | | |
|---|---|---|---|---|
| 2022/0078734 | A1 | 3/2022 | Zhang | |
| 2022/0086780 | A1 | 3/2022 | Tsai et al. | |
| 2022/0225258 | A1 * | 7/2022 | Ratasuk | H04W 72/20 |
| 2022/0225322 | A1 * | 7/2022 | Shim | H04L 1/08 |
| 2022/0279455 | A1 * | 9/2022 | Cozzo | H04W 52/08 |
| 2023/0131305 | A1 | 4/2023 | Cozzo et al. | |
| 2023/0216711 | A1 * | 7/2023 | Yao | H04L 5/0051<br>370/328 |
| 2023/0397195 | A1 * | 12/2023 | Shin | H04W 72/1268 |
| 2024/0163067 | A1 * | 5/2024 | Xiong | H04L 5/0053 |
| 2024/0188055 | A1 * | 6/2024 | Su | H04L 5/0094 |
| 2024/0188075 | A1 * | 6/2024 | Tran | H04W 72/1268 |
| 2024/0235779 | A1 * | 7/2024 | Wang | H04L 5/0048 |
| 2025/0024548 | A1 * | 1/2025 | Zhao | H04L 5/0044 |
| 2025/0056506 | A1 * | 2/2025 | Shim | H04L 1/08 |
| 2025/0097935 | A1 * | 3/2025 | Shim | H04W 52/14 |

OTHER PUBLICATIONS

3GPP: "3rd Generation Partnership Project, Technical Specification Group Radio Access Network, NR, Radio Resource Control (RRC) Protocol Specification (Release 17)", 3GPP Organizational Partners, Sophia Antipolis Valbonne, France, 3GPP TS 38.331 V17.0.0, Mar. 2022, pp. 1-1221.

MCC Support: "Final Report of 3GPP TSG RAN WG1 #106-e v3.0.0 (Online Meeting, Aug. 16-27, 2021)", 3GPP TSG RAN WG1 Meeting #106bis-e, R1-2110434, e-Meeting, Oct. 11-19, 2021, p. 115, pp. 1-166.

International Search Report and Written Opinion—PCT/US2023/069880—ISA/EPO—Nov. 2, 2023.

Thales: "Revised WID: NR NTN (Non-Terrestrial Networks) Enhancements", 3GPP TTG RAN Meeting #96, RP-221819, (revision of RP-220953), Budapest, Hungary, Jun. 6-9, 2022, 8 Pages.

* cited by examiner

TDW Configuration
TDW Start
316
TDW Length
317
322
TA Value

Network Entity 105-a 320
315
305
UE
115-b
310
330
324

Parameter(s)
TDW Duration
TA Value
Cell Type
Elevation Angle
RSRP Value

Criteria
Duration Threshold
TA Threshold
Cell Type List
Elevation Angle Threshold
RSRP Threshold Network Entity 105-a 323
326
327

300

400-a 400-b

PRIORITY-BASED TIMING ADVANCE (TA) ADJUSTMENT

INTRODUCTION

The following relates to wireless communications, including timing advance (TA) adjustment.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, and/or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), and/or discrete Fourier transform spread orthogonal frequency division multiplexing (DFT-S-OFDM). A wireless multiple-access communications system may include one or more base stations, each supporting wireless communication for communication devices, which may be known as user equipment (UEs).

SUMMARY

A method for wireless communication at a UE is described. The method may include receiving a first message indicating a time domain window (TDW) configuration including a start of a TDW and a length of the TDW, the TDW configuration associated with joint channel estimation for the UE. The method may also include receiving, during the TDW and based on the TDW configuration, a second message including a TA command, the TA command indicating a TA value for the UE, and transmitting, during the TDW, a third message in accordance with the TA value based on one or more parameters satisfying one or more criteria associated with the one or more parameters, the one or more parameters associated with the UE.

An apparatus for wireless communication at a UE is described. The apparatus may include a processor and memory coupled with the processor, the processor configured to receive a first message indicating a TDW configuration including a start of a TDW and a length of the TDW, the TDW configuration associated with joint channel estimation for the UE, receive, during the TDW and based on the TDW configuration, a second message including a TA command, the TA command indicating a TA value for the UE, and transmit, during the TDW, a third message in accordance with the TA value based on one or more parameters satisfying one or more criteria associated with the one or more parameters, the one or more parameters associated with the UE.

Another apparatus for wireless communication at a UE is described. The apparatus may include means for receiving a first message indicating a TDW configuration including a start of a TDW and a length of the TDW, the TDW configuration associated with joint channel estimation for the UE, means for receiving, during the TDW and based on the TDW configuration, a second message including a TA command, the TA command indicating a TA value for the UE, and means for transmitting, during the TDW, a third message in accordance with the TA value based on one or more parameters satisfying one or more criteria associated with the one or more parameters, the one or more parameters associated with the UE.

A non-transitory computer-readable medium storing code for wireless communication at a UE is described. The code may include instructions executable by a processor to receive a first message indicating a TDW configuration including a start of a TDW and a length of the TDW, the TDW configuration associated with joint channel estimation for the UE, receive, during the TDW and based on the TDW configuration, a second message including a TA command, the TA command indicating a TA value for the UE, and transmit, during the TDW, a third message in accordance with the TA value based on one or more parameters satisfying one or more criteria associated with the one or more parameters, the one or more parameters associated with the UE.

Some examples of the method, apparatuses, and non-transitory computer-readable medium described herein may further include operations, features, means, or instructions for transmitting the third message according to a transmission time that may be shifted in time based on the TA value.

Some examples of the method, apparatuses, and non-transitory computer-readable medium described herein may further include operations, features, means, or instructions for receiving a control message indicating the one or more criteria, where the third message may be transmitted based on the control message.

Some examples of the method, apparatuses, and non-transitory computer-readable medium described herein may further include operations, features, means, or instructions for receiving a radio resource control (RRC) message, a medium access control-control element (MAC-CE), or downlink control information (DCI).

In some examples of the method, apparatuses, and non-transitory computer-readable medium described herein, the one or more parameters include the TA value and the one or more criteria include a TA threshold.

In some examples of the method, apparatuses, and non-transitory computer-readable medium described herein, the one or more parameters include an elevation angle between the UE and a network entity and the one or more criteria include an elevation angle threshold.

In some examples of the method, apparatuses, and non-transitory computer-readable medium described herein, the one or more parameters include a duration of the TDW and the one or more criteria include a TDW threshold duration.

Some examples of the method, apparatuses, and non-transitory computer-readable medium described herein may further include operations, features, means, or instructions for measuring a reference signal receive power (RSRP) associated with one or more reference signals, transmitting, prior to the TDW, a report including the measured RSRP where, the one or more parameters include the measured RSRP, and the one or more criteria include a RSRP threshold.

In some examples of the method, apparatuses, and non-transitory computer-readable medium described herein, the one or more parameters include a cell type and the one or more criteria include one or more cell types including the cell type.

In some examples of the method, apparatuses, and non-transitory computer-readable medium described herein, the UE may be operating in a non-terrestrial network (NTN).

A method for wireless communication at a UE is described. The method may include receiving a first message indicating a TDW configuration including a start of a TDW and a length of the TDW, the TDW configuration associated with joint channel estimation for the UE. The method may also include receiving, during the TDW and based on the TDW configuration, a second message including a TA command, the TA command indicating a TA value for the UE, and transmitting, during the TDW, a third message independent of the TA value based on one or more parameters satisfying one or more criteria associated with the one or more parameters, the one or more parameters associated with the UE.

An apparatus for wireless communication at a UE is described. The apparatus may include a processor and memory coupled with the processor, the processor configured to receive a first message indicating a TDW configuration including a start of a TDW and a length of the TDW, the TDW configuration associated with joint channel estimation for the UE, receive, during the TDW and based on the TDW configuration, a second message including a TA command, the TA command indicating a TA value for the UE, and transmit, during the TDW, a third message independent of the TA value based on one or more parameters satisfying one or more criteria associated with the one or more parameters, the one or more parameters associated with the UE.

Another apparatus for wireless communication at a UE is described. The apparatus may include means for receiving a first message indicating a TDW configuration including a start of a TDW and a length of the TDW, the TDW configuration associated with joint channel estimation for the UE, means for receiving, during the TDW and based on the TDW configuration, a second message including a TA command, the TA command indicating a TA value for the UE, and means for transmitting, during the TDW, a third message independent of the TA value based on one or more parameters satisfying one or more criteria associated with the one or more parameters, the one or more parameters associated with the UE.

A non-transitory computer-readable medium storing code for wireless communication at a UE is described. The code may include instructions executable by a processor to receive a first message indicating a TDW configuration including a start of a TDW and a length of the TDW, the TDW configuration associated with joint channel estimation for the UE, receive, during the TDW and based on the TDW configuration, a second message including a TA command, the TA command indicating a TA value for the UE, and transmit, during the TDW, a third message independent of the TA value based on one or more parameters satisfying one or more criteria associated with the one or more parameters, the one or more parameters associated with the UE.

Some examples of the method, apparatuses, and non-transitory computer-readable medium described herein may further include operations, features, means, or instructions for maintaining a transmit power, a phase continuity, or both across one or more uplink channel transmissions, where the third message includes the one or more uplink channel transmissions and refraining from shifting a transmission time for the third message in accordance with the TA value.

Some examples of the method, apparatuses, and non-transitory computer-readable medium described herein may further include operations, features, means, or instructions for receiving a control message indicating the one or more criteria, where the third message may be transmitted based on the control message.

Some examples of the method, apparatuses, and non-transitory computer-readable medium described herein may further include operations, features, means, or instructions for receiving a system information block (SIB) message, DCI, a MAC-CE, or an RRC message.

In some examples of the method, apparatuses, and non-transitory computer-readable medium described herein, the one or more parameters include the TA value and the one or more criteria include a TA threshold.

In some examples of the method, apparatuses, and non-transitory computer-readable medium described herein, the one or more parameters include an elevation angle between the UE and a network entity and the one or more criteria include an elevation angle threshold.

In some examples of the method, apparatuses, and non-transitory computer-readable medium described herein, the one or more parameters include a duration of the TDW and the one or more criteria include a TDW threshold duration.

Some examples of the method, apparatuses, and non-transitory computer-readable medium described herein may further include operations, features, means, or instructions for measuring a RSRP associated with one or more reference signals, transmitting, prior to the TDW, a report including the measured RSRP where, the one or more parameters include the measured RSRP, and the one or more criteria include a RSRP threshold.

In some examples of the method, apparatuses, and non-transitory computer-readable medium described herein, the one or more parameters include a cell type and the one or more criteria include one or more cell types including the cell type.

In some examples of the method, apparatuses, and non-transitory computer-readable medium described herein, the UE may be operating in an NTN.

A method for wireless communication at a network entity is described. The method may include outputting a first message indicating a TDW configuration including a start of a TDW and a length of the TDW, the time domain configuration associated with joint channel estimation for a UE. The method may also include outputting, during the TDW and based on the TDW configuration, a second message including a TA command, the TA command indicating a TA value for the UE, and obtaining, during the TDW, a third message in accordance with the TA value based on one or more parameters satisfying one or more criteria associated with the one or more parameters, the one or more parameters associated with the UE.

An apparatus for wireless communication at a network entity is described. The apparatus may include a processor and memory coupled with the processor, the processor configured to output a first message indicating a TDW configuration including a start of a TDW and a length of the TDW, the time domain configuration associated with joint channel estimation for a UE, output, during the TDW and based on the TDW configuration, a second message including a TA command, the TA command indicating a TA value for the UE, and obtain, during the TDW, a third message in accordance with the TA value based on one or more parameters satisfying one or more criteria associated with the one or more parameters, the one or more parameters associated with the UE.

Another apparatus for wireless communication at a network entity is described. The apparatus may include means for outputting a first message indicating a TDW configuration including a start of a TDW and a length of the TDW, the time domain configuration associated with joint channel estimation for a UE, means for outputting, during the TDW and based on the TDW configuration, a second message including a TA command, the TA command indicating a TA value for the UE, and means for obtaining, during the TDW, a third message in accordance with the TA value based on one or more parameters satisfying one or more criteria associated with the one or more parameters, the one or more parameters associated with the UE.

A non-transitory computer-readable medium storing code for wireless communication at a network entity is described. The code may include instructions executable by a processor to output a first message indicating a TDW configuration including a start of a TDW and a length of the TDW, the time domain configuration associated with joint channel estimation for a UE, output, during the TDW and based on the TDW configuration, a second message including a TA command, the TA command indicating a TA value for the UE, and obtain, during the TDW, a third message in accordance with the TA value based on one or more parameters satisfying one or more criteria associated with the one or more parameters, the one or more parameters associated with the UE.

Some examples of the method, apparatuses, and non-transitory computer-readable medium described herein may further include operations, features, means, or instructions for obtaining the third message according to a transmission time that may be shifted in time based on the TA value.

Some examples of the method, apparatuses, and non-transitory computer-readable medium described herein may further include operations, features, means, or instructions for outputting a control message indicating the one or more criteria, where the third message may be obtained based on the control message.

Some examples of the method, apparatuses, and non-transitory computer-readable medium described herein may further include operations, features, means, or instructions for outputting an RRC message, a MAC-CE, or DCI.

In some examples of the method, apparatuses, and non-transitory computer-readable medium described herein, the one or more parameters include the TA value and the one or more criteria include a TA threshold.

In some examples of the method, apparatuses, and non-transitory computer-readable medium described herein, the one or more parameters include an elevation angle between the UE and the network entity and the one or more criteria include an elevation angle threshold.

In some examples of the method, apparatuses, and non-transitory computer-readable medium described herein, the one or more parameters include a duration of the TDW and the one or more criteria include a TDW threshold duration.

Some examples of the method, apparatuses, and non-transitory computer-readable medium described herein may further include operations, features, means, or instructions for obtaining, prior to the TDW, a report including a measured RSRP where, the one or more parameters include the measured RSRP, and the one or more criteria include a RSRP threshold.

In some examples of the method, apparatuses, and non-transitory computer-readable medium described herein, the one or more parameters include a cell type and the one or more criteria include one or more cell types including the cell type.

In some examples of the method, apparatuses, and non-transitory computer-readable medium described herein, the network entity may be operating in an NTN.

A method for wireless communication at a network entity is described. The method may include outputting a first message indicating a TDW configuration including a start of a TDW and a length of the TDW, the TDW configuration associated with joint channel estimation for a UE. The method may also include outputting, during the TDW and based on the TDW configuration, a second message including a TA command, the TA command indicating a TA value for the UE, and obtaining, during the TDW, a third message independent of the TA value based on one or more parameters satisfying one or more criteria associated with the one or more parameters, the one or more parameters associated with the UE.

An apparatus for wireless communication at a network entity is described. The apparatus may include a processor and memory coupled with the processor, the processor configured to output a first message indicating a TDW configuration including a start of a TDW and a length of the TDW, the TDW configuration associated with joint channel estimation for a UE, output, during the TDW and based on the TDW configuration, a second message including a TA command, the TA command indicating a TA value for the UE, and obtain, during the TDW, a third message independent of the TA value based on one or more parameters satisfying one or more criteria associated with the one or more parameters, the one or more parameters associated with the UE.

Another apparatus for wireless communication at a network entity is described. The apparatus may include means for outputting a first message indicating a TDW configuration including a start of a TDW and a length of the TDW, the TDW configuration associated with joint channel estimation for a UE, means for outputting, during the TDW and based on the TDW configuration, a second message including a TA command, the TA command indicating a TA value for the UE, and means for obtaining, during the TDW, a third message independent of the TA value based on one or more parameters satisfying one or more criteria associated with the one or more parameters, the one or more parameters associated with the UE.

A non-transitory computer-readable medium storing code for wireless communication at a network entity is described. The code may include instructions executable by a processor to output a first message indicating a TDW configuration including a start of a TDW and a length of the TDW, the TDW configuration associated with joint channel estimation for a UE, output, during the TDW and based on the TDW configuration, a second message including a TA command, the TA command indicating a TA value for the UE, and obtain, during the TDW, a third message independent of the TA value based on one or more parameters satisfying one or more criteria associated with the one or more parameters, the one or more parameters associated with the UE.

Some examples of the method, apparatuses, and non-transitory computer-readable medium described herein may further include operations, features, means, or instructions for performing a joint channel estimation procedure across two or more uplink channel transmissions, where the third message includes the two or more uplink channel transmissions.

Some examples of the method, apparatuses, and non-transitory computer-readable medium described herein may further include operations, features, means, or instructions for outputting a control message indicating the one or more criteria, where the third message may be received based on the control message.

Some examples of the method, apparatuses, and non-transitory computer-readable medium described herein may further include operations, features, means, or instructions for outputting a SIB message, DCI, a MAC-CE, or an RRC message.

In some examples of the method, apparatuses, and non-transitory computer-readable medium described herein, the one or more parameters include the TA value and the one or more criteria include a TA threshold.

In some examples of the method, apparatuses, and non-transitory computer-readable medium described herein, the one or more parameters include an elevation angle between the UE and the network entity and the one or more criteria include an elevation angle threshold.

In some examples of the method, apparatuses, and non-transitory computer-readable medium described herein, the one or more parameters include a duration of the TDW and the one or more criteria include a TDW threshold duration.

Some examples of the method, apparatuses, and non-transitory computer-readable medium described herein may further include operations, features, means, or instructions for obtaining, prior to the TDW, a report including a measured RSRP where, the one or more parameters include the measured RSRP, and the one or more criteria include a RSRP threshold.

In some examples of the method, apparatuses, and non-transitory computer-readable medium described herein, the one or more parameters include a cell type and the one or more criteria include one or more cell types including the cell type.

In some examples of the method, apparatuses, and non-transitory computer-readable medium described herein, the network entity may be operating in an NTN.

DETAILED DESCRIPTION

Figure 1:
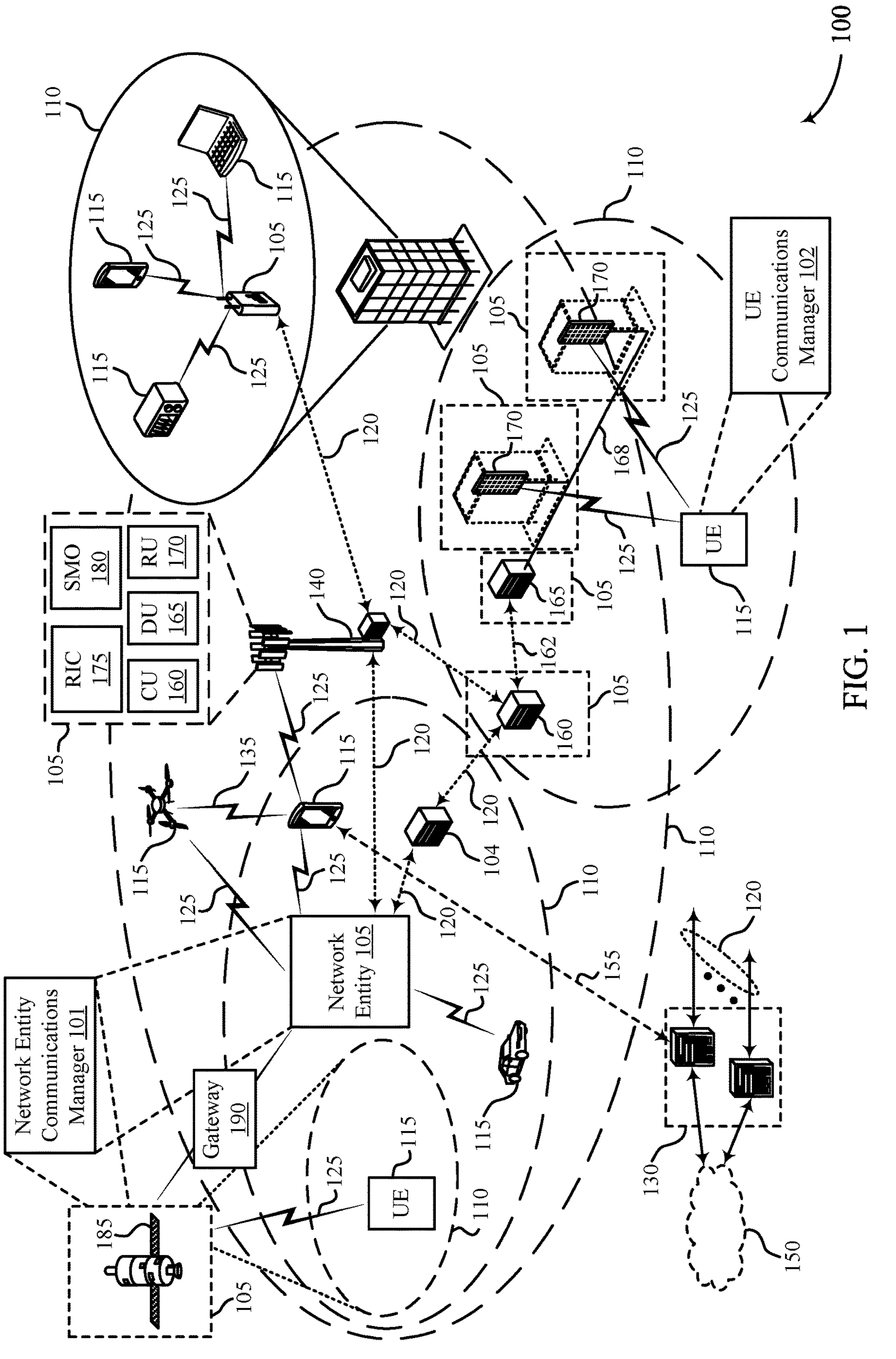
FIG. 1 illustrates an example of a wireless communications system that supports priority-based TA adjustment in accordance with one or more aspects of the present disclosure.

In some wireless communications systems, a UE may connect to a wireless network via a cell of an NTN. As described herein, a cell may refer to a combination of frequency resources (e.g., carrier frequencies) and spatial resources (e.g., geographic zones, aerial zones, or directional beams) used for wireless communications. An NTN may refer to a wireless communications system that includes non-terrestrial communication devices such as satellites, zeppelins, dirigibles, balloons, and/or drones, among other examples, and an NTN cell may be supported by an NTN network entity, which may be a satellite, a zeppelin, a dirigible, a balloon, a drone, unmanned aerial vehicle (UAV), and/or another aerial device and/or any device capable of air to ground (ATG) communications. Additionally, or alternatively, the UE may connect to the wireless network via a cell of a terrestrial network (TN). A TN may refer to a wireless communications system that includes terrestrial communication devices such as base stations, access points, and/or internet of things (IoT) devices, among other examples. A TN cell may be supported by a TN network entity, which may be a base station, components of a base station and/or network entity, an access point, an IoT device, and/or another terrestrial device.

In an NTN, a network entity (e.g., a NTN network entity) may include non-terrestrial components, terrestrial components, and/or both. For example, a radio unit (RU) component may be at a satellite (e.g., non-terrestrial), while a distributed unit (DU) component, a central unit (CU) component, and/or both may be terrestrial components. Thus, a network entity (e.g., an NTN network entity, a TN network entity, and/or network entity) may refer to an RU component (e.g., a non-terrestrial satellite), a DU component at a terrestrial base station, a terrestrial gateway component, a terrestrial CU component, and/or any combination thereof. The non-terrestrial components of the network entity may orbit earth (and terrestrial components located on earth) at a speed similar to or relative to earth's speed or earth's rotational speed.

In some cases, a network entity, which may be an example of a non-terrestrial communication device and/or a terrestrial communication device, may receive control signaling and/or data from a UE via an uplink shared channel transmission (e.g., a physical uplink shared channel (PUSCH) transmission), an uplink control channel transmission (e.g., a physical uplink control channel (PUCCH) transmission), and/or both. The transmissions may include one or more reference signals for channel estimation, such as demodulation reference signals (DMRSs) which may be used to determine and/or generate channel estimates for demodulation of a channel. That is, channel estimation for data demodulation may be based on DMRS symbols within a slot, where a slot is a flexible scheduling unit in the time-domain including multiple symbols. For one or more UEs (e.g., UEs at the edge of a coverage area of the network entity), the performance degradation due to channel estimation error may be relatively large. Thus, in some cases, the network entity may perform DMRS bundling, or joint channel estimation, in which the UE may send a DMRS according to a periodicity during a given time period. For example, the UE may send a DMRS in multiple transmission time intervals (TTIs), such as slots, min-slots, symbols, and/or the like for coverage enhancement. In some cases, the TTIs may be referred to as a TDW for the joint channel estimation. In some cases, a component of the network entity (e.g., a terrestrial base station and/or component) may configure the TDW by transmitting a message with start (e.g., a start time, a starting TTI such as a slot and/or symbol) of the TDW and a duration and/or length (e.g., a number of TTIs in time) of the TDW to the UE.

In some examples, the UE may receive a TA command during the TDW indicating for the UE to advance uplink message by a TA value indicated by the TA command. The network entity may transmit the TA command to control an uplink message timing of the UE using the TA value. According to one or more examples, the TA value may account for an amount of time for a message to travel over the air between the UE and a network entity, which may be referred to a propagation delay, such that uplink messages from multiple UEs in communication with the network entity may be synchronized. A UE closer to the network entity may have a shorter propagation delay, and thus a smaller TA value. Similarly, a UE farther away from the network entity may have a longer propagation delay, and thus a larger TA value. In some cases, one or more non-terrestrial components of the network entity may be moving with a relatively large velocity (e.g., orbiting earth), and may be relatively far from the UE. Thus, it may be relatively important for the UE to account for the propagation delay when performing an uplink message, due to the longer propagation delay and high velocity of the non-terrestrial components of the network entity (e.g., the components may be in a different location by the time the uplink message reaches the components if no TA value is accounted for and if the components are moving relatively fast).

If the network entity performs joint channel estimation during the TDW, the UE may refrain from performing a TA adjustment when the UE receives a TA command. That is, in one example the UE may not perform TA adjustment by not applying the TA value indicated by the TA command for an uplink message, and/or uplink transmissions. However, a UE refraining from performing the TA adjustment may cause a network entity to fail to receive an uplink message from the UE due to the velocity and/or speed at which the non-terrestrial components of the network entity move. That is, the network entity (e.g., a satellite in an NTN system) may be moving at a relatively high velocity, such that without a TA value applied to an uplink transmission, the network entity may be at a different location. The network entity may miss, improperly monitor for, and/or fail to decode the uplink message from the UE if the UE refrains from performing the TA adjustment.

Aspects of the present disclosure may support techniques for prioritizing a TA adjustment at a UE or a joint channel estimation procedure at a network entity during a TDW based on one or more parameters satisfying criteria. During the joint channel estimation procedure at the network entity, the UE may maintain a power consistency and phase continuity for a continuous wave transmission. The continuous wave transmission may include one or more DMRSs for DMRS bundling at the network entity. According to one or more examples, the criterial may be r if the TDW duration exceeds a threshold, if the TA value exceeds a threshold, if a cell type (e.g., a satellite type) is a specific cell type, if an elevation angle exceeds a threshold, and/or if an RSRP exceeds a threshold. If the criteria are satisfied, the UE may prioritize the TA adjustment over maintaining power consistency and phase continuity for DMRS bundling during the TDW (e.g., the UE may apply the TA value for uplink transmission during the TDW). Additionally, or alternatively, if the TDW is below a threshold, the TA value is below a threshold, the cell type (e.g., satellite type) is a specific cell type, the elevation angle is below a threshold, the UE may prioritize maintaining power consistency and phase continuity for a continuous wave transmission for transmitting DMRSs for DMRS bundling at the network entity over the TA adjustment during the TDW (e.g., the UE may perform transmissions without the TA adjustment and/or independent of the TA value). The UE may transmit one or more uplink transmissions during the TDW in accordance with the TA value and/or independent of (e.g., without applying) the TA value depending on the prioritization. The UE prioritizing the TA value and/or the continuous wave transmission during the TDW may provide for reduced signaling overhead due to improved signaling reliability based on the UE determining the parameters satisfy the criteria, more efficient usage of time-frequency resources due to the improved signaling reliability, and the like during the TDW.

Aspects of the disclosure are initially described in the context of wireless communications systems. Aspects of the disclosure are further illustrated by and described with reference to resource diagrams, process flows, apparatus diagrams, system diagrams, and flowcharts that relate to priority-based TA adjustment.

FIG. 1 illustrates an example of a wireless communications system 100 that supports priority-based TA adjustment in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, and/or a network operating in accordance with other systems and radio technologies, including future systems and radio technologies not explicitly mentioned herein.

The network entities 105 may be dispersed throughout a geographic area to form the wireless communications system 100 and may include devices in different forms and/or having different capabilities. In various examples, a network entity 105 may be referred to as a network element, a mobility element, a radio access network (RAN) node, and/or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, and/or mobile, and/or both at different times. The UEs 115 may be devices in different forms and/or having different capabilities. Some example UEs 115 are illustrated in FIG. 1. The UEs 115 described herein may be capable of supporting communications with various types of devices, such as other UEs 115 and/or network entities 105, as shown in FIG. 1.

As described herein, a node of the wireless communications system 100, which may be referred to as a network node, and/or a wireless node, may be a network entity 105

(e.g., any network entity described herein), a UE 115 (e.g., any UE described herein), a network controller, an apparatus, a device, a computing system, one or more components, and/or another suitable processing entity configured to perform any of the techniques described herein. For example, a node may be a UE 115. As another example, a node may be a network entity 105. As another example, a first node may be configured to communicate with a second node and/or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, and/or the like may include disclosure of the UE 115, network entity 105, apparatus, device, computing system, and/or the like being a node. For example, disclosure that a UE 115 is configured to receive information from a network entity 105 also discloses that a first node is configured to receive information from a second node.

In some examples, network entities 105 may communicate with the core network 130, and/or with one another, and/or both. For example, network entities 105 may communicate with the core network 130 via one or more backhaul communication links 120 (e.g., in accordance with an S1, N2, N3, and/or other interface protocol). In some examples, network entities 105 may communicate with one another via a backhaul communication link 120 (e.g., in accordance with an X2, Xn, and/or other interface protocol) either directly (e.g., directly between network entities 105) and/or indirectly (e.g., via a core network 130). In some examples, network entities 105 may communicate with one another via a midhaul communication link 162 (e.g., in accordance with a midhaul interface protocol) and/or a fronthaul communication link 168 (e.g., in accordance with a fronthaul interface protocol), and/or any combination thereof. The backhaul communication links 120, midhaul communication links 162, and/or fronthaul communication links 168 may be and/or include one or more wired links (e.g., an electrical link, an optical fiber link), one or more wireless links (e.g., a radio link, a wireless optical link), among other examples and/or various combinations thereof. A UE 115 may communicate with the core network 130 via a communication link 155.

One or more of the network entities 105 described herein may include and/or may be referred to as a base station 140 (e.g., a base transceiver station, a radio base station, an NR base station, an access point, a radio transceiver, a NodeB, an eNodeB (eNB), a next-generation NodeB and/or a giga-NodeB (either of which may be referred to as a gNB), a 5G NB, a next-generation eNB (ng-eNB), a Home NodeB, a Home eNodeB, and/or other suitable terminology). In some examples, a network entity 105 (e.g., a base station 140) may be implemented in an aggregated (e.g., monolithic, standalone) base station architecture, which may be configured to utilize a protocol stack that is physically and/or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically and/or logically distributed among two or more network entities 105, such as an integrated access backhaul (IAB) network, an open RAN (O-RAN) (e.g., a network configuration sponsored by the O-RAN Alliance), and/or a virtualized RAN (vRAN) (e.g., a cloud RAN (C-RAN)). For example, a network entity 105 may include one or more of a CU 160, a DU 165, a RU 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, and/or any combination thereof. An RU 170 may also be referred to as a radio head, a smart radio head, a remote radio head (RRH), a remote radio unit (RRU), and/or a transmission reception point (TRP). One or more components of the network entities 105 in a disaggregated RAN architecture may be co-located, and/or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, and/or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 and/or RUs 170, and the one or more DUs 165 and/or RUs 170 may host lower protocol layers, such as layer 1 (L1) (e.g., physical (PHY) layer) and/or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, and/or between a DU 165 and an RU 170 may be within a protocol layer (e.g., some functions for a protocol layer may be performed by one of a CU 160, a DU 165, and/or an RU 170, while other functions of the protocol layer are performed by a different one of the CU 160, the DU 165, and/or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 and/or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity and/or an IAB donor. One or more DUs 165 and/or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, and/or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain and/or configuration of the access network (e.g., downstream). In such cases, one or more components of the disaggregated RAN architecture (e.g., one or more IAB nodes 104 and/or components of IAB nodes 104) may be configured to operate according to the techniques described herein.

In the case of the techniques described herein applied in the context of a disaggregated RAN architecture, one or more components of the disaggregated RAN architecture may be configured to support UE mobility between an NTN and a TN as described herein. For example, some operations described as being performed by a UE 115 and/or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include and/or may be referred to as a mobile device, a wireless device, a remote device, a handheld device, and/or a subscriber device, and/or some other suitable terminology, where the "device" may also be referred to as a unit, a station, a terminal, and/or a client, among other examples. A UE 115 may also include and/or may be referred to as a personal electronic device such as a cellular phone, a personal digital assistant (PDA), a tablet computer, a laptop computer, and/or a personal computer. In some examples, a UE 115 may include and/or be referred to as a wireless local loop (WLL) station, an Internet of Things (IoT) device, an Internet of Everything (IoE) device, and/or a machine type communications (MTC) device, among other examples, which may be implemented in various objects such as appliances, and/or vehicles, meters, among other examples.

The UEs 115 described herein may be able to communicate with various types of devices, such as other UEs 115 that may sometimes act as relays as well as the network entities 105 and the network equipment including macro eNBs and/or gNBs, small cell eNBs and/or gNBs, and/or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, and/or other signaling. The wireless communications system 100 may support communication with a UE 115 using carrier aggregation and/or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," and/or "communicating," when referring to a network entity 105, may refer to any portion of a network entity 105 (e.g., a base station 140, a CU 160, a DU 165, a RU 170) of a RAN communicating with another device (e.g., directly and/or via one or more other network entities 105).

In some examples, such as in a carrier aggregation configuration, a carrier may also have acquisition signaling and/or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, and/or the carrier may be operated in a non-standalone mode, in which case a connection is anchored using a different carrier (e.g., of the same and/or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, and/or both, among other configurations of transmissions. Carriers may carry downlink and/or uplink communications (e.g., in an FDD mode) and/or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier and/or the wireless communications system 100. For example, the carrier bandwidth may be one of a set of bandwidths for carriers of a particular radio access technology (e.g., 1.4, 3, 5, 10, 15, 20, 40, and/or 80 megahertz (MHz)). Devices of the wireless communications system 100 (e.g., the network entities 105, the UEs 115, and/or both) may have hardware configurations that support communications using a particular carrier bandwidth and/or may be configurable to support communications using one of a set of carrier bandwidths. In some examples, the wireless communications system 100 may include network entities 105 and/or UEs 115 that support concurrent communications using carriers associated with multiple carrier bandwidths. In some examples, each served UE 115 may be configured for operating using portions (e.g., a sub-band, a BWP) and/or all of a carrier bandwidth.

Signal waveforms transmitted via a carrier may be made up of multiple subcarriers (e.g., using multi-carrier modulation (MCM) techniques such as orthogonal frequency division multiplexing (OFDM) and/or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, and/or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate and/or data integrity for communications with a UE 115.

One or more numerologies for a carrier may be supported, and a numerology may include a subcarrier spacing (Δf) and a cyclic prefix. A carrier may be divided into one or more BWPs having the same and/or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 and/or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes and/or slots, and each subframe and/or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one and/or more symbols. Excluding the cyclic prefix, each symbol period may be associated with one or more (e.g., $N_f$) sampling periods. The duration of a symbol period may depend on the subcarrier spacing and/or frequency band of operation.

A subframe, a slot, a mini-slot, and/or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, and/or hybrid TDM-FDM techniques. A control region (e.g., a control resource set (CORESET)) for a physical control channel may be defined by a set of symbol periods and may extend across the system bandwidth and/or a subset of the system bandwidth of the carrier. One or more control regions (e.g., CORESETs) may be configured for a set of the UEs 115. For example, one or more of the UEs 115 may monitor and/or search control regions for control information according to one or more search space sets, and each search space set may include one or multiple control channel candidates in one and/or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, and/or other types of cells, and/or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), and/or others). In some examples, a cell also may refer to a coverage area 110 and/or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be and/or include a building, a subset of a building, and/or exterior spaces between and/or overlapping with coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same and/or different (e.g., licensed, unlicensed) frequency bands as macro cells. Small cells may provide unrestricted access to the UEs 115 with service subscriptions with the network provider and/or may provide restricted access to the UEs 115 having an association with the small cell (e.g., the UEs 115 in a closed subscriber group (CSG), the UEs 115 associated with users in a home and/or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same and/or different radio access technologies.

The wireless communications system 100 may be configured to support ultra-reliable communications and/or low-latency communications, and/or various combinations thereof. For example, the wireless communications system 100 may be configured to support ultra-reliable low-latency communications (URLLC). The UEs 115 may be designed to support ultra-reliable, low-latency, and/or critical functions. Ultra-reliable communications may include private communication and/or group communication and may be supported by one or more services such as push-to-talk, video, and/or data. Support for ultra-reliable, low-latency functions may include prioritization of services, and such services may be used for public safety and/or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, and/or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 and/or may be otherwise unable to and/or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, and/or mobility functions. The core network 130 may be an evolved packet core (EPC) and/or 5G core (5GC), which may include at least one control plane entity that manages access and mobility (e.g., a mobility management entity (MME), an access and mobility management function (AMF)) and at least one user plane entity that routes packets and/or interconnects to external networks (e.g., a serving gateway (S-GW), a Packet Data Network (PDN) gateway (P-GW), and/or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), and/or a Packet-Switched Streaming Service.

The wireless communications system 100 may operate using one or more frequency bands, which may be in the range of 300 megahertz (MHz) to 300 gigahertz (GHz). The region from 300 MHz to 3 GHz may be known as the ultra-high frequency (UHF) region and/or decimeter band because the wavelengths range from approximately one decimeter to one meter in length. UHF waves may be blocked and/or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) and/or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, and/or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, and/or D2D transmissions, among other examples.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a “Sub-6 GHz” band in various documents and articles. A similar nomenclature issue sometimes occurs regarding FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a and/or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" and/or the like if used herein may broadly represent frequencies that may be less than 6 GHz, may be within FR1, and/or may include mid-band frequencies. Further, unless specifically stated otherwise, it should be understood that the term "millimeter wave" and/or the like if used herein may broadly represent frequencies that may include mid-band frequencies, may be within FR2, FR4, FR4-a and/or FR4-1, and/or FR5, and/or may be within the EHF band.

A network entity 105 (e.g., a base station 140, an RU 170) and/or a UE 115 may be equipped with multiple antennas, which may be used to employ techniques such as transmit diversity, receive diversity, multiple-input multiple-output (MIMO) communications, and/or beamforming. The antennas of a network entity 105 and/or a UE 115 may be located within one or more antenna arrays or antenna panels, which may support MIMO operations and/or transmit and/or receive beamforming. For example, one or more base station antennas and/or antenna arrays may be co-located at an antenna assembly, such as an antenna tower. In some examples, antennas and/or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO and/or beamforming operations. Additionally, or alternatively, an antenna panel may support RF beamforming for a signal transmitted via an antenna port.

Beamforming, which may also be referred to as spatial filtering, directional transmission, and/or directional reception, is a signal processing technique that may be used at a transmitting device and/or a receiving device (e.g., a network entity 105, a UE 115) to shape and/or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device and/or a receiving device applying amplitude offsets, phase offsets, and/or both to signals carried via the antenna elements associated with the device. The adjustments associated with each of the antenna elements may be defined by a beamforming weight set associated with a particular orientation (e.g., with respect to the antenna array of the transmitting device and/or receiving device, and/or with respect to some other orientation).

The wireless communications system 100 may be a packet-based network that operates according to a layered protocol stack. In the user plane, communications at the bearer and/or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, and/or both to support retransmissions to improve link efficiency. In the control plane, an RRC layer may provide establishment, configuration, and maintenance of an RRC connection between a UE 115 and a network entity 105 and/or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARD) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, and/or according to some other time interval.

As described herein, a node, which may be referred to as a node, a network node, a network entity, and/or a wireless node, may be a base station 140 (e.g., any base station described herein), a UE 115 (e.g., any UE described herein), a network controller, an apparatus, a device, a computing system, one or more components, and/or another suitable processing entity configured to perform any of the techniques described herein. For example, a network node may be a UE 115. As another example, a network node may be a base station 140. As another example, a first network node may be configured to communicate with a second network node and/or a third network node. In one aspect of this example, the first network node may be a UE 115, the second network node may be a base station 140, and the third network node may be a UE 115. In another aspect of this example, the first network node may be a UE 115, the second network node may be a base station 140, and the third network node may be a base station 140. In yet other aspects of this example, the first, second, and third network nodes may be different relative to these examples.

Similarly, reference to a UE 115, a base station 140, apparatus, device, computing system, and/or the like may include disclosure of the UE 115, base station 140, apparatus, device, computing system, and/or the like being a network node. For example, disclosure that a UE 115 is configured to receive information from a base station 140 also discloses that a first network node is configured to receive information from a second network node. Consistent with this disclosure, once a specific example is broadened in accordance with this disclosure (e.g., a UE 115 is configured to receive information from a base station 140 also discloses that a first network node is configured to receive information from a second network node), the broader example of the narrower example may be interpreted in the reverse, but in a broad open-ended way. In the example above where a UE 115 being configured to receive information from a base station 140 also discloses that a first network node being configured to receive information from a second network node, the first network node may refer to a first UE 115, a first base station 140, a first apparatus, a first device, a first computing system, a first one or more components, a first processing entity, and/or the like configured to receive the information; and the second network node may refer to a second UE 115, a second base station 140, a second apparatus, a second device, a second computing system, a second one or more components, a second processing entity, and/or the like.

As described herein, communication of information (e.g., any information, signal, and/or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, and/or transmit information to the second network node. Similarly, in this example and consistent with this disclosure, disclosure that the first network node is configured to transmit information to the second network node includes disclosure that the second network node is configured to receive, obtain, and/or decode the information that is provided, sent, output, communicated, and/or transmitted by the first network node.

A network entity communications manager 101 may manage communications between a network entity 105 and other devices in the wireless communications system 100. In a similar manner, a UE communications manager 102 may manage communications between a UE 115 and other devices in the wireless communications system 100. As described herein, a network entity 105 may have one or more components that refer to a terrestrial communication device (such as a base station 140) and/or a non-terrestrial communication device (such as a satellite 185). For example, a NTN network entity 105, and/or non-terrestrial components of a network entity 105, may be connected to a terrestrial network entity 105, and/or a base station, via a gateway 190. That is, in an NTN, a network entity (e.g., a NTN network entity) may include non-terrestrial components, terrestrial components, and/or both. For example, a RU component may be at a satellite (e.g., non-terrestrial), while a DU component, a CU component, and/or both may be at a terrestrial base station. Thus, a network entity (e.g., an NTN network entity, a TN network entity, and/or network entity) may refer to an RU component at a satellite, a DU component at a terrestrial base station, a terrestrial gateway component, a terrestrial CU component, and/or any combination thereof. The non-terrestrial components of the network entity may orbit earth and its terrestrial components at a velocity and/or speed relative to and/or similar to earth's speed and/or earth's rotational speed.

In some examples, a UE 115, a network entity 105, and/or both may perform joint channel estimation, which may be referred to as DMRS bundling, to estimate one or more channel characteristics for communicating via a channel between the UE 115 and the network entity 105. For example, a transmitting device such as the UE 115, the network entity 105, and/or both may transmit one or more reference signals, such as DMRSs, via a channel which a receiving device (e.g., the UE 115, the network entity 105, and/or both) may use to estimate one or more channel characteristics and/or properties of the channel. The UE 115, the network entity 105, and/or both may transmit a DRMS across multiple slots or a different DMRS for each slot. The DMRS bundling at a UE 115 may provide for a network entity 105 to perform joint channel estimations over multiple slots independent of (e.g., without constraints on) how many DMRS are included per slot. Thus, the receiving device may perform joint channel estimation based on the DMRSs across the one or more slots, where a slot is a dynamic scheduling unit of time that may be scheduled for uplink, downlink, and/or both.

In some cases, the network entity 105 may configure a TDW for performing joint channel estimation, where the TDW defines the number of slots over which a UE 115 transmit the DMRSs. The UE 115 may receive a TA command from the network entity 105 including a TA value, which may indicate a duration that accounts for an amount of time for a transmission to travel between the UE 115 and the network entity 105. The UE 115 may apply the TA value to a transmission to the network entity 105 by shifting the transmission earlier in time by the TA value. In some cases, such as in a NTN, the UE 115 may apply the TA value to transmissions to prevent and/or reduce timing errors, as a satellite (e.g., and non-terrestrial components of a network entity 105) may move relatively quickly and the distance of the transmission may be relatively large (e.g., for low earth orbit (LEO) satellites compared to terrestrial devices). In some examples, if the UE 115 receives the TA command during the TDW, the UE 115 may wait until the end of the TDW to apply the TA value for one or more transmissions to the network entity 105. Further, a network entity 105 may wait until the end of a TDW to transmit a TA command to the UE 115. However, waiting until the end of the TDW to transmit and/or apply a TA command may impact the ability of the network entity 105 to receive the transmission (e.g., because the non-terrestrial components of the network entity 105 may move during the TDW). That is, in some wireless communications systems 100, such as in an NTN, a TA adjustment may have a higher priority when compared with a joint channel estimation procedure during multiple slots in a TDW.

In some examples, a UE 115 may determine whether one or more parameters satisfy criteria prior to transmitting signaling to a network entity 105. For example, if a TDW duration exceeds a threshold, if a TA value exceeds a threshold, if a cell type (e.g., a satellite type) is a specific cell type, if an elevation angle exceeds a threshold, and/or if an RSRP exceeds a threshold, the UE 115 may prioritize the TA adjustment for the signaling. Similarly, if the TDW is below a threshold, the TA value is below a threshold, the cell type (e.g., satellite type) is a specific cell type, the elevation angle is below a threshold, the UE 115 may prioritize maintaining a transmit power, a phase continuity, and/or both for the joint channel estimation during the TDW (e.g., independent of the TA value). In some cases, the network entity 105 may control the priority of whether the UE 115-*b* should perform the TA adjustment during the TDW and/or maintain the transmit power and the phase continuity for a continuous wave transmission for the joint channel estimation procedure during the TDW and not perform (e.g., refrain from performing) the TA adjustment during the TDW.

Figure 2:
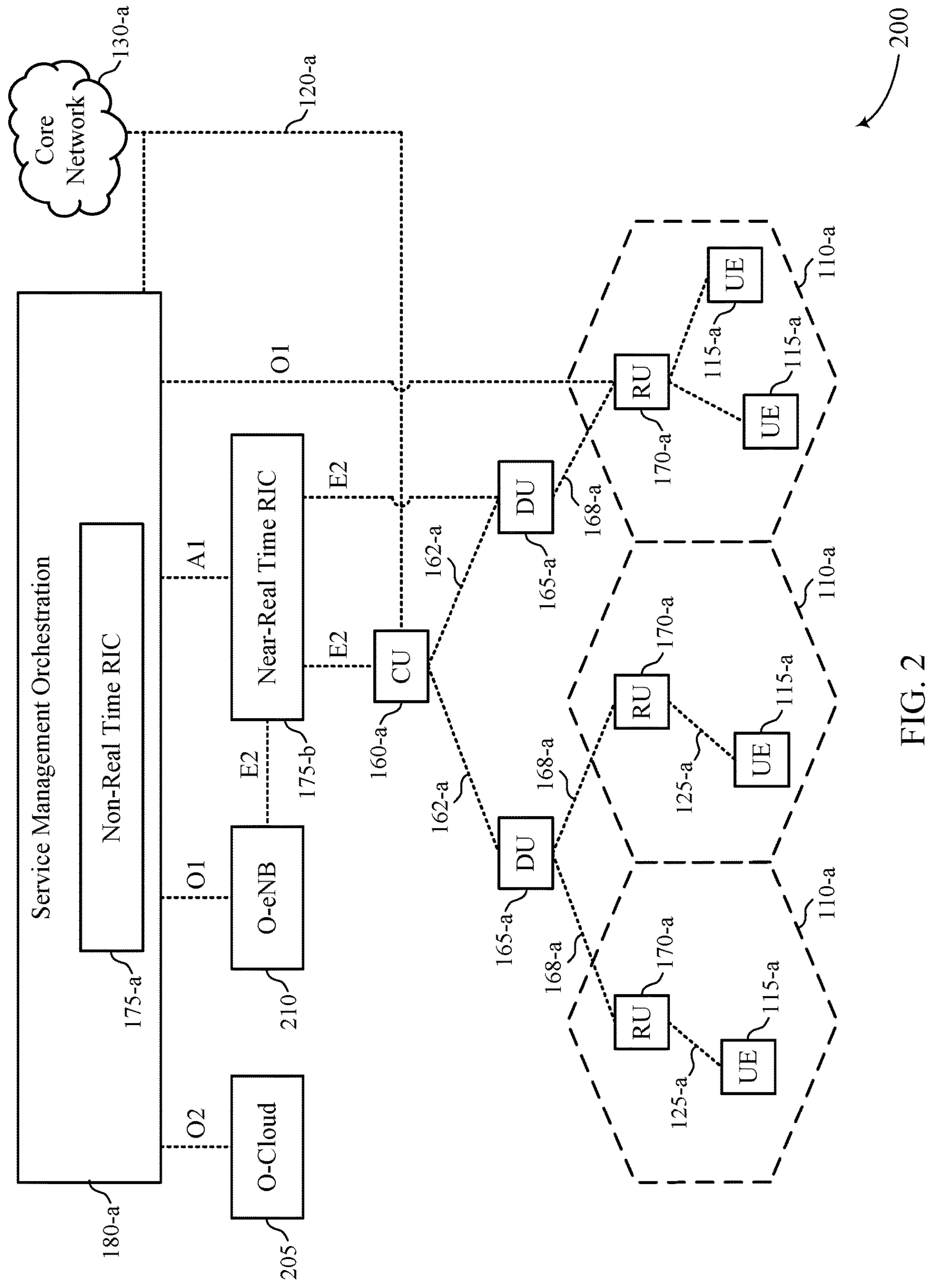
FIG. 2 illustrates an example of a network architecture that supports priority-based TA adjustment in accordance with one or more aspects of the present disclosure.

FIG. 2 illustrates an example of a network architecture 200 (e.g., a disaggregated base station architecture, a disaggregated RAN architecture) that supports priority-based TA adjustment in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, and/or indirectly with the core network 130-*a* through one or more disaggregated network entities 105 (e.g., a Near-RT RIC 175-*b* via an E2 link, and/or a Non-RT RIC 175-*a* associated with an SMO 180-*a* (e.g., an SMO Framework), and/or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces and/or may be coupled with one or more interfaces configured to receive and/or transmit signals (e.g., data, information) via a wired and/or wireless transmission medium. Each network entity 105, and/or an associated processor (e.g., controller) providing instructions to an interface of the network entity 105, may be configured to communicate with one or more of the other network entities 105 via the transmission medium. For example, the network entities 105 may include a wired interface configured to receive and/or transmit signals over a wired transmission medium to one or more of the other network entities 105. Additionally, or alternatively, the network entities 105 may include a wireless interface, which may include a receiver, a transmitter, and/or transceiver (e.g., an RF transceiver) configured to receive and/or transmit signals, and/or both, over a wireless transmission medium to one or more of the other network entities 105.

In some examples, a CU 160-*a* may host one or more higher layer control functions. Such control functions may include RRC, PDCP, SDAP, and/or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), and/or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, and/or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, and/or low-PHY layer functions (e.g., performing fast Fourier transform (FFT), inverse FFT (iFFT), digital beamforming, physical random access channel (PRACH) extraction and filtering, and/or the like), and/or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) and/or Machine Learning (ML) workflows including model training and updates, and/or policy-based guidance of applications/features in the Near-RT RIC 175-*b*. The Non-RT RIC 175-*a* may be coupled to and/or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters and/or external enrichment information from external servers. Such information may be utilized by the Near-RT RIC 175-*b* and may be received at the SMO 180-*a* and/or the Non-RT RIC 175-*a* from non-network data sources and/or from network functions. In some examples, the Non-RT RIC 175-*a* and/or the Near-RT RIC 175-*b* may be configured to tune RAN behavior and/or performance. For example, the Non-RT RIC 175-*a* may monitor long-term trends and patterns for performance and employ AI and/or ML models to perform corrective actions through the SMO 180-*a* (e.g., reconfiguration via O1) and/or via generation of RAN management policies (e.g., A1 policies).

In some examples, an RU 170-*a* may transmit and/or receive signaling, such as reference signals, data signaling, and/or the like at a network entity, a UE, and/or both. For example, an RU 170-*a* may transmit and/or receive a message (e.g., a control message) indicating a TDW configuration with a start time of the TDW and a length of the TDW. The TDW may define a duration for which a wireless device (e.g., one or more components of a network entity) may perform joint channel estimation. The RU 170-*a* may additionally, or alternatively, transmit and/or receive a TA command indicating a TA value that may account for a time a signal takes to travel between wireless devices. In some cases, the RU 170-*a* may transmit and/or receive the TA command during the TDW, and may transmitting and/or receiving reference signals for a joint channel estimation procedure and/or transmitting and/or receiving signaling according to a TA value.

In some examples, a DU 165-*a*, a CU 160-*a*, and/or both may determine a TDW configuration that the RU 170-*a* transmits and/or receives (e.g., at a network entity and/or UE, respectively). That is, the DU 165-*a*, the CU 160-*a*, and/or both may determine a start time of a TDW and a length of the TDW to include in the TDW configuration. Similarly, the DU 165-*a*, the CU 160-*a*, and/or both may determine whether to prioritize the joint channel estimation procedure and/or the TA adjustment based on comparing one or more parameters to a set of criteria (e.g., thresholds). The DU 165-*a*, the CU 160-*a*, and/or both may trigger the transmission and/or reception of the reference signals for the joint channel estimation procedure and/or the signaling according to the TA value at the RU 170-*a*. The DU 165-*a*, the CU 160-*a*, and/or both may operate at a UE, a network entity, and/or both to determine the TDW configuration and/or the prioritization of the reference signal transmission and/or signaling in accordance with the TA value.

In an NTN, a network entity (e.g., a NTN network entity) may include non-terrestrial components, terrestrial components, and/or both. For example, an RU 170-*a* may be at a satellite (e.g., non-terrestrial), while a DU 165-*a*, a CU 160-*a*, and/or both may be at a terrestrial base station. Thus, a network entity (e.g., an NTN network entity, a TN network entity, and/or network entity) may refer to an RU 170-*a* at a satellite, a DU 165-*a* at a terrestrial base station, a terrestrial gateway component, and a terrestrial CU 160-*a*. The non-terrestrial components of the network entity may orbit earth (and its terrestrial components) at a velocity and/or speed relative to and/or similar to earth's speed and/or earth's rotational speed.

Figure 3:
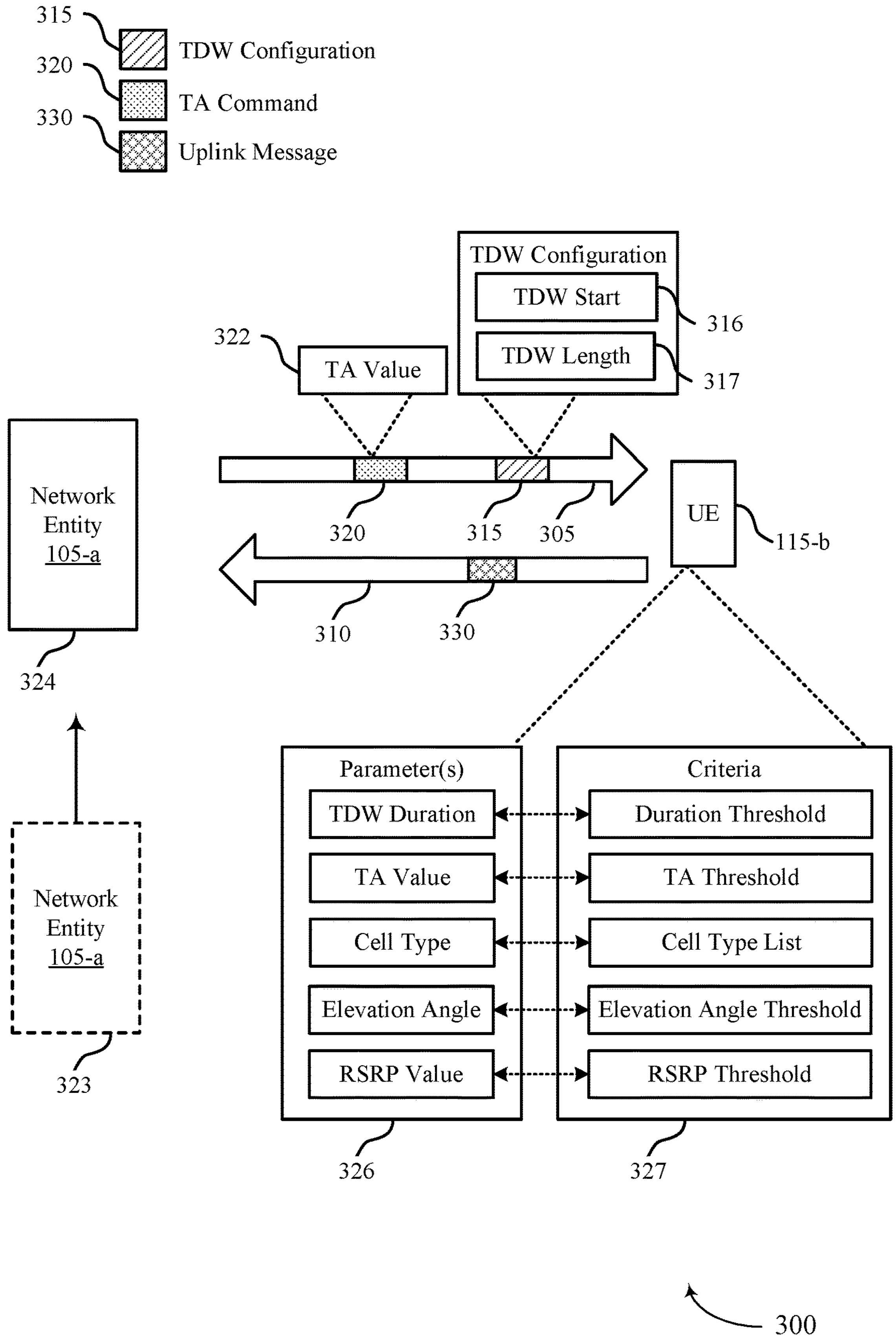
FIG. 3 illustrates an example of a wireless communications system that supports priority-based TA adjustment in accordance with one or more aspects of the present disclosure.

FIG. 3 illustrates an example of a wireless communications system 300 that supports priority-based TA adjustment in accordance with one or more aspects of the present disclosure. The wireless communications system 300 may be an example of a wireless communications system 100 as described with reference to FIG. 1. In some examples, the wireless communications system 300 may include a network architecture 200 as described with reference to FIG. 2. The wireless communications system 300 may include a UE 115-*b*, which may be an example of a UE 115 as described with reference to FIGS. 1 and 2, and a network entity 105-*a*, which may be an example of a network entity 105 as described with reference to FIGS. 1 and 2. In some cases, the network entity 105-*a* may be an example of a TN entity—such as a base station 140—a NTN network entity—such as a satellite 185. The wireless communications system 300 may support prioritizing a TA adjustment for communications between the UE 115-*b* and the network entity 105-*a* during a TDW based on one or more criteria 327.

In some cases, the UE 115-*b* may be connected to the network via the network entity 105-*a*, which may be an example of a NTN network entity and/or a terrestrial network entity. For example, the UE 115-*b* may be located within the coverage area of the network entity 105-*a*. The network entity 105-*a* may communicate control signaling, data, and/or both with the UE 115-*b* via a downlink communication link 305. Similarly, the UE 115-*b* may communicate control signaling, data, and/or both with the network entity 105-*a* via an uplink communication link 310.

In some examples, a UE 115-*b*, a network entity 105-*a*, and/or both may perform joint channel estimation, which may be referred to as DMRS bundling, to estimate one or more channel characteristics for receiving a transmission. For example, a UE 115-*b*, a network entity 105-*a*, and/or both may transmit one or more reference signals, such as DMRSs, which a receiving device may use to estimate one or more channel characteristics and/or properties. The UE 115-*b*, the network entity 105-*a*, and/or both may transmit a DRMS across multiple slots or a different DMRS for each slot. The DMRS bundling at the UE 115-*a* may provide for the network entity 105-*a* to perform joint channel estimations over multiple slots independent of (e.g., without constraints on) how many DMRS are included per slot. Thus, the receiving device may perform joint channel estimation based on the DMRSs across the one or more slots, where a slot is a dynamic scheduling unit of time that may be scheduled for uplink, downlink, and/or both. In some cases, the UE 115-*b*, the network entity 105-*a*, and/or both may support the joint channel estimation over back-to-back and non-back-to-back uplink transmissions (e.g., PUSCH transmissions, PUCCH transmissions, and/or both).

In some cases, the network entity 105-*a* may configure a TDW for joint channel estimation, where the TDW defines the number of slots over which the UE 115-*b*, the network entity 105-*a*, and/or both transmit the DMRSs. For example, the network entity 105-*a* may transmit a message indicating a TDW configuration 315 to the UE 115-*b* via the downlink communication link 305. The TDW configuration 315 may include a TDW start 316 (e.g., an index and/or time of the starting slot), a TDW length 317 (e.g., a number of slots that the TDW spans), and/or both. The network entity 105-*a* may configure the start of a first TDW as the start of a first uplink transmission (e.g., PUSCH transmission), and the network entity 105-*a* may define the TDW length 317 by a parameter in control signaling (e.g., a TimeDomainWindowLength parameter in RRC signaling, a MAC-CE, a DCI message, and/or the like). The network entity 105-*a* may configure the TDW length 317 for an uplink shared channel separately from an uplink control channel. During the TDW, the UE 115-*b* may be capable of maintaining power consistency and phase continuity among one or more uplink transmissions. That is, if the network entity 105-*a* does not trigger the UE 115-*b* to maintain the power consistency and phase continuity for multiple DMRSs, the UE 115-*b* may still be capable of maintaining the power consistency and phase continuity, but may not maintain the power consistency and phase continuity.

In some cases, the UE 115-*b* may receive a TA command 320 from the network entity 105-*a* via the downlink communication link 305. The TA command 320 may include a TA value 322, which may indicate a duration that accounts for an amount of time for a transmission to travel between the UE 115-*b* and the network entity 105-*a*. The UE 115-*b* may apply the TA value 322 to a transmission to the network entity 105-*a* by shifting the transmission earlier in time by the TA value 322. In some cases, such as in a NTN, the UE 115-*b* may apply the TA value 322 to transmissions to prevent timing errors, as a satellite and therefore non-terrestrial components of the network entity 105-*a* may move relatively quickly and the distance of the transmission may be relatively large (e.g., for LEO satellites). For example, the network entity 105-*a* may move at a relatively high velocity relative to the UE 115-*b* from a position 323 to a different position 324. In some examples, if the UE 115-*b* receives the TA command during the TDW, the UE 115-*b* may wait until the end of the TDW to apply the TA value 322 to one or more transmissions to the network entity 105-*a*. Further, a network entity 105-*a* may wait until the end of a TDW to transmit a TA command to the UE 115-*b*. However, waiting until the end of the TDW to transmit and/or apply a TA command may impact the ability of the network entity 105-*a* to receive the transmission (e.g., because the non-terrestrial components of the network entity 105-*a* may move in the TDW). That is, in some wireless communications systems, such as in an NTN, a TA adjustment may have a relatively high priority when compared with a joint channel estimation procedure during multiple slots in a TDW.

In some examples, at 325, a UE 115-*b* may determine whether one or more parameters 326 satisfy criteria 327 prior to transmitting uplink message 330 to the network entity 105-*a*. For example, if a TDW duration of the TDW configuration 315 exceeds a threshold, if a TA value 322 of the TA command 320 exceeds a threshold, if a cell type (e.g., a satellite type) is a specific cell type, if an elevation angle exceeds a threshold, and/or if an RSRP exceeds a threshold, the UE 115-*b* may prioritize the TA adjustment for the uplink message 330. Similarly, if the TDW is below a threshold, the TA value 322 is below a threshold, the cell type (e.g., satellite type) is a specific cell type, the elevation angle is below a threshold, the UE 115-*b* may prioritize maintaining a transmit power and a phase continuity for the joint channel estimation during the TDW (e.g., independent of the TA value 322), such that the UE 115-*b* transmits one or more DMRSs in a continuous wave transmission during the TDW. That is, the uplink message 330 may include the one or more DMRSs during the TDW. In some cases, the network entity 105-*a* may control the priority of whether the UE 115-*b* should perform the TA adjustment during the TDW and/or maintain the transmit power and the phase continuity for the joint channel estimation procedure during the TDW and not perform (e.g., refrain from performing) the TA adjustment during the TDW.

In some cases, if the TA adjustment has a higher priority than the joint channel estimation (e.g., a value in the TA command is larger than a threshold value), the network entity 105-*a* may configure the UE 115-*b* to perform the TA adjustment, even during the TDW. The network entity 105-*a* may transmit control signaling (e.g., RRC signaling, a MAC-CE, a DCI message, and/or the like) indicating for the UE 115-*b* to perform the TA adjustment during the TDW, and/or configuring the threshold value. Additionally, or alternatively, the network entity 105-*a* may include the indication to perform the TA adjustment in the TDW configuration 315, in the TA command 320, and/or both. For example, if the network entity 105-*a* is a LEO satellite, the TA value 322 may be relatively large, and may satisfy the threshold value.

In some other cases, if the TA adjustment has a lower priority than the joint channel estimation (e.g., if an uplink transmission from the UE 115-*b* experiences a harsh radio condition), the network entity 105-*a* may configure the UE 115-*b* perform a TA adjustment to the uplink message 330 after the TDW. For example, if the network entity 105-*a* is a GEO satellite, the non-terrestrial components of the network entity 105-*a* may move at a relatively low velocity, and the network entity 105-*a* may prioritize the joint channel estimation. In some cases, the network entity 105-*a* may indicate to the UE 115-*b* to prioritize the joint channel estimation by maintaining a transmit power and a phase continuity for a continuous wave transmission during the TDW in a broadcasted message, such as a SIB, and/or by dedicated signaling (e.g., a DCI message, a MAC-CE, RRC signaling, and/or any combination thereof).

In some examples, the network entity 105-*a* may configure the criterion the UE 115-*b* uses to determine whether to prioritize the TA adjustment and/or maintaining the transmit power and the phase continuity for the continuous transmission (e.g., for the joint channel estimation and/or DMRS bundling) during the TDW. For example, the network entity 105-*a* may transmit control signaling, such as RRC signaling, a MAC-CE, a DCI message, and/or the like, indicating the one or more criterion. In some other examples, the criterion may be otherwise defined at the UE 115-*b*. In some cases, the criterion may include a TDW duration threshold (e.g., the UE 115-*b* prioritizes a continuous transmission if a configured TDW duration is below the TDW duration threshold), a TA adjustment threshold (e.g., the UE 115-*b* prioritizes the TA adjustment if a TA value 322 in the TA command 320 is larger than the threshold), a defined list of satellite types (e.g., the UE 115-*b* prioritizes the TA adjustment if the network entity 105-*a* is a LEO satellite, while the UE 115-*b* prioritizes a continuous transmission if the network entity 105-*a* is a GEO satellite), an elevation angle threshold (e.g., the UE 115-*b* may prioritize the TA adjustment if an elevation angle is above a threshold), an RSRP threshold (e.g., the UE 115-*b* may prioritize the TA adjustment if an RSRP value is below a threshold), and/or any combination thereof. Similarly, the parameters 326 may include a TDW duration, a TA adjustment value, a satellite type, an elevation angle, an RSRP value, and/or any combination thereof.

In some cases, the network entity 105-*a* may determine a maximum and minimum value of elevation angle based on a beam footprint (e.g., a coverage area on earth of a satellite beam). The UE 115-*b* may measure an elevation angle between the UE 115-*b* and the network entity 105-*a* and report the value to the network entity 105-*a*. The network entity 105-*a* may decode the elevation angle, and the network entity 105-*a*, the UE 115-*b*, and/or both may use the elevation angle to compare with the elevation angle threshold. In some cases, the UE 115-*b* may measure and report the elevation angle to the network entity 105-*a* before the start of the TDW.

In some cases, the UE 115-*b* may perform one or more measurements on reference signals, such as to determine an RSRP. The UE 115-*b* may report the RSRP to the network entity 105-*a*. The network entity 105-*a* may decode the report prior to a TDW. The UE 115-*b*, the network entity 105-*a*, and/or both may compare the RSRP to the criteria 327 to determine whether to apply the TA value 322 and/or maintain the transmit power and the phase continuity for the continuous wave transmission for joint channel estimation at the network entity 105-*a*. For example, if the RSRP is above and/or below a threshold RSRP value, the UE 115-*b* may perform the TA adjustment. In some other examples, if the RSRP is above and/or below the threshold RSRP value, the UE 115-*b* may not perform the TA adjustment, and may instead perform the continuous wave transmission for the joint channel estimation by maintaining a transmit power and a phase continuity.

Figure 4A:
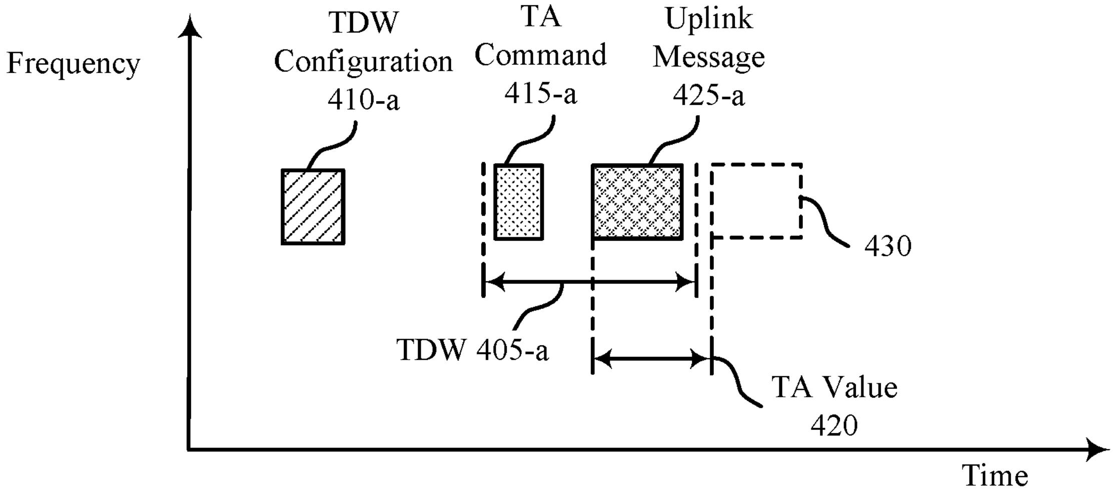
FIGS. 4A and 4B illustrate examples of resource diagrams that support priority-based TA adjustment in accordance with one or more aspects of the present disclosure.

The UE 115-*b* may transmit the uplink message 330 in accordance with the determination at 325, which is described in further detail with respect to FIG. 4A and FIG.

4B. For example, the UE 115-*b* may transmit control information and/or data in accordance with the TA value 322 in the TA command 320. In some other examples, the UE 115-*b* may refrain from transmitting, and/or may not transmit, the control information and/or data until after the TDW and/or without adjusting for the TA value 322 in the TA command 320. Instead, the UE 115-*b* may be capable of maintaining power consistency and phase continuity for a continuous transmission for joint channel estimation, where the continuous transmission includes DMRSs over the TDW.

Figure 4B:
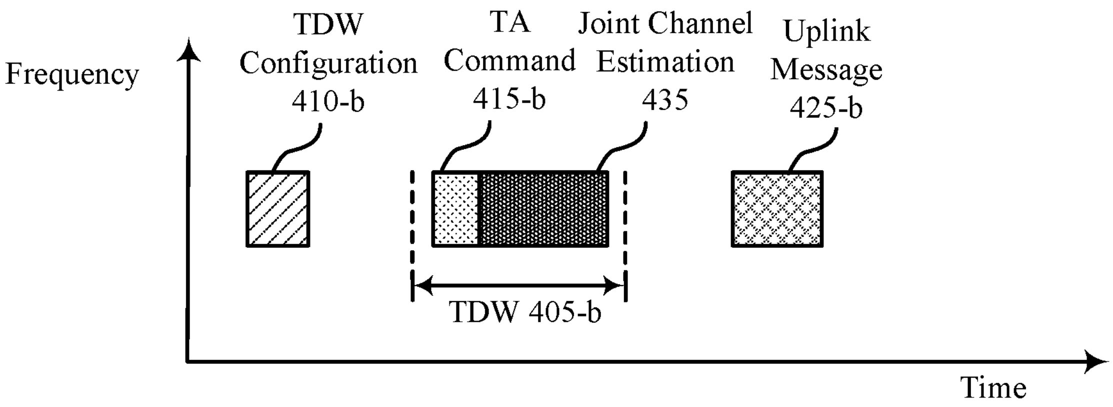

FIGS. 4A and 4B illustrate examples of a resource diagram 400-*a* and a resource diagram 400-*b*, respectively, that support priority-based TA adjustment in accordance with one or more aspects of the present disclosure. In some examples, the resource diagram 400-*a* and the resource diagram 400-*b* may implement aspects of the wireless communications system 100, the network architecture 200, the wireless communications system 300, and/or any combination thereof. For example, the resource diagram 400-*a* may illustrate an example of a wireless device determining to adjust signaling by a TA during a TDW 405-*a*, while resource diagram 400-*b* may illustrate an example of a wireless device performing a continuous wave transmission for joint channel estimation during a TDW 405-*b*.

In some examples, a network entity, such as a network entity 105 as described with reference to FIGS. 1 and 3 (e.g., a TN device and/or an NTN device), may transmit a TDW configuration to a UE, such as a UE 115 as described with reference to FIGS. 1 and 3. For example, a terrestrial base station and/or a non-terrestrial satellite may transmit a TDW configuration 410-*a*, a TDW configuration 410-*b*, and/or both to the UE. The TDW configuration 410-*a* and the TDW configuration 410-*b* may each include a start of the TDW 405-*a* and the TDW 405-*b*, respectively, and a length of the TDW 405-*a* and the TDW 405-*b*, respectively. The TDW 405-*a* and the TDW 405-*b* may define a duration during which the network entity performs joint channel estimation, or during which the UE transmits one or more DMRSs for the joint channel estimation, as described with reference to FIG. 3. The UE may transmit a continuous wave for the network entity to perform the joint channel estimation (e.g., during the TDW 405-*a* and the TDW 405-*b*). However, the UE may receive a TA command 415-*a* and/or a TA command 415-*b* during the TDW 405-*a* and/or the TDW 405-*b*, respectively. A TA command may include a TA value 420, which may indicate a duration, and/or timing offset, that accounts for an amount of time for uplink message 425-*a* and/or uplink message 425-*b* to travel between the UE and a network entity (e.g., a satellite).

If the UE waits until the end of the TDW 405-*a* and/or the TDW 405-*b* to transmit the uplink message 425-*a* and/or the uplink message 425-*b*, respectively, and/or apply the TA value 420 to the uplink message 425-*a* and/or the uplink message 425-*b*, then the network entity may not receive the uplink message 425-*a* and/or the uplink message 425-*b*. That is, the network entity may be moving at a relatively high velocity, such as for a LEO satellite that travels with a high velocity relative to earth, and waiting until the end of a TDW to transmit signaling according to the TA value 420 may cause the network entity to fail to decode and/or detect the signaling. In some other examples, the network entity may be moving at a relatively low velocity, such as for a GEO satellite that stays stationary relative to earth, such that the network entity may perform the joint channel estimation during the TDW 405-*a* and the TDW 405-*b*. Thus, the UE may determine to prioritize maintaining a transmit power and a phase continuity for a continuous wave transmission including one or more DMRSs of a joint channel estimation procedure or prioritize signaling according to a TA value 420 during a TDW.

For example, as illustrate with reference to FIG. 4A, the UE may determine to prioritize a TA value 420 for the uplink message 425-*a*. A network entity may schedule signaling for one or more time-frequency resource 430. However, the UE may receive the TA command 415-*a* during the TDW 405-*a*, where the TA command 415-*a* indicates for the UE to advance the uplink message 425-*a* by the TA value 420. The UE advancing the uplink message 425-*a* by the TA value 420 may include the UE transmitting the uplink message 425-*a* during the TDW 405-*a*, and refraining from maintaining a transmit power and a phase continuity across one or more uplink channel transmissions in the TDW 405-*a* for the joint channel estimation at the network entity during the TDW 405-*a*. The UE may determine to adjust the uplink message 425-*a* according to the TA value 420 based on comparing one or more parameters to one or more criteria. For example, if a length of the TDW 405-*a* (e.g., a TDW duration) exceeds a threshold, if a TA value 420 exceeds a threshold, if a cell type (e.g., a satellite type) is a specific cell type, if an elevation angle exceeds a threshold, and/or if an RSRP exceeds and/or otherwise satisfies a threshold, the UE may prioritize the TA adjustment for the uplink message 425-*a*.

In some other examples, as illustrate with reference to FIG. 4B, the UE may determine to prioritize a maintaining a transmit power and a phase continuity across one or more uplink channel transmissions in a TDW 405-*b* for joint channel estimation 435. A network entity may schedule uplink message 425-*b* for one or more time-frequency resource. In some cases, the UE may receive the TA command 415-*b* during the TDW 405-*b*, where the TA command 415-*b* may indicate for the UE to advance the uplink message 425-*b* by a TA value. The UE advancing the uplink message 425-*b* by the TA value may include the UE transmitting the uplink message 425-*b* during the TDW 405-*b*, and not maintaining a transmit power and a phase continuity for the joint channel estimation 435 during the TDW 405-*b*. However, the UE may determine not to adjust the uplink message 425-*b* according to the TA value based on comparing one or more parameters to one or more criteria. That is, the UE may transmit the uplink message 425-*b* independent of the TA value, such as after the TDW 405-*b*. For example, if the TDW is below a threshold, the TA value is below a threshold, the cell type (e.g., satellite type) is a specific cell type, the elevation angle is below a threshold, the UE may prioritize maintaining a transmit power and a phase continuity for a continuous wave transmission for the joint channel estimation 435 during the TDW (e.g., independent of the TA value).

In some cases, the network entity may control the priority of whether the UE should perform the TA adjustment during the TDW 405-*a* and/or the TDW 405-*b* and/or maintain the transmit power and a phase continuity for the joint channel estimation 435 at the network entity during the TDW 405-*a* and/or the TDW 405-*b* and not perform (e.g., refrain from performing) the TA adjustment during the TDW 405-*a* and/or the TDW 405-*b*. In some cases, if the TA adjustment has a higher priority than the joint channel estimation 435 (e.g., a value in the TA command 415-*a* is larger than a threshold value), the network entity may configure the UE to perform the TA adjustment, even during the TDW 405-*a*. The network entity may transmit control signaling (e.g., RRC signaling, a MAC-CE, a DCI message, and/or the like) indicating for the UE to perform the TA adjustment during the TDW 405-*a*, and/or configuring the one or more criteria. Additionally, or alternatively, the network entity may include the indication to perform the TA adjustment in the TDW configuration 410-*a*, in the TA command 415-*a*, and/or both. For example, if the network entity is a LEO satellite, the TA value may be relatively large, and may satisfy the one or more criteria.

Similarly, if the joint channel estimation 435 has a higher priority than the TA adjustment (e.g., a value in the TA command 415-*b* is less than and/or equal to a threshold value), the network entity may configure the UE to maintain a transmit power and a phase continuity across one or more uplink channel transmissions in the TDW 405-*b* for the joint channel estimation 435. The network entity may transmit control signaling (e.g., RRC signaling, a MAC-CE, a DCI message, and/or the like) indicating for the UE to maintain the transmit power and the phase continuity for a continuous wave transmission for the network entity to perform the joint channel estimation 435 during the TDW 405-*b*, and/or configuring the one or more criteria. Additionally, or alternatively, the network entity may include the indication to maintain the transmit power and the phase continuity in the TDW configuration 410-*b*, in the TA command 415-*b*, and/or both. For example, if the network entity is a GEO satellite, the TA value may be relatively small, and may not satisfy the one or more criteria (e.g., and the UE may perform the joint channel estimation 435).

Figure 5:
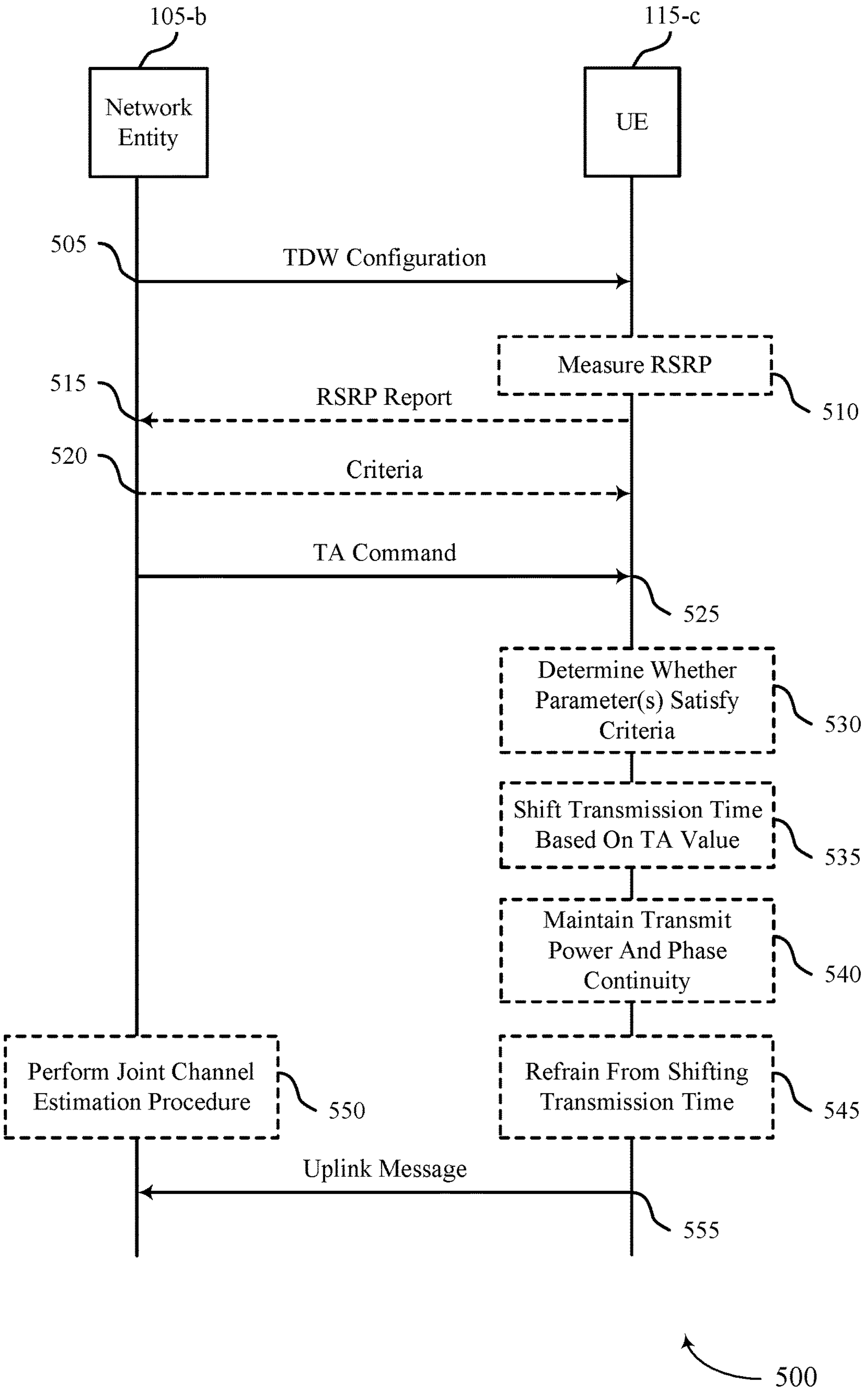
FIG. 5 illustrates an example of a process flow that supports priority-based TA adjustment in accordance with one or more aspects of the present disclosure.

FIG. 5 illustrates an example of a process flow 500 that supports priority-based TA adjustment in accordance with one or more aspects of the present disclosure. The process flow 500 may be implemented in a wireless communications system 100, a wireless communications system 300, a resource diagram 400-*a*, and/or a resource diagram 400-*b* as described with reference to FIGS. 1, 3, 4A, and 4B. The process flow 500 may include a UE 115-*c*, which may be an example of a UE 115 as described with reference to FIGS. 1 through 4, and may include a network entity 105-*b*, which may be an example of a network entity 105 as described with reference to FIGS. 1 through 4. The process flow 500 may support a UE prioritizing maintaining a transmit power and a phase continuity for a joint channel estimation and/or prioritizing a TA adjustment based on one or more parameters satisfying criteria. In the following description of the process flow 500, the operations performed by the devices may be performed in different orders and/or at different times. Additionally, or alternatively, some operations may be omitted from the process flow 500, and other operations may be added to the process flow 500.

In some examples, the network entity 105-*b* may be an example of a TN network entity, such as a base station. In some other examples, the network entity 105-*b* may be an example of a NTN network entity, such as a satellite (e.g., LEO satellite, a GEO satellite, and/or any other satellite). The UE 115-*c* and the network entity 105-*b* may operate in an NTN.

At 505, the network entity 105-*b* may transmit a TDW configuration to the UE 115-*c*. For example, a base station, a satellite, and/or the like may transmit the TDW configuration to the UE 115-*c*. The TDW configuration may include a start of a TDW and a length of a TDW, where the TDW defines a duration over which the network entity 105-*b* is to perform a joint channel estimation (e.g., DMRS bundling). The network entity 105-*b* may transmit the TDW configuration in control signaling, such as RRC signaling, a MAC-CE, and/or the like.

At 510, the UE 115-*c* may perform one or more measurements on one or more reference signals, such as to obtain an RSRP of the one or more reference signals.

At 515, the UE 115-*c* may transmit a report to the network entity 105-*b* including the one or more measurements, such as a report including the RSRP. The UE 115-*c* may transmit the report prior to the TDW.

At 520, the network entity 105-*b* may indicate one or more criteria for determining whether to prioritize maintaining a transmit power and a phase continuity for the continuous wave transmission of the joint channel estimation during the TDW and/or prioritize a TA adjustment for signaling during the TDW. In some examples, the network entity 105-*b* may transmit, and/or output, the indication of the criteria in control signaling, such as a broadcast message (e.g., a SIB), RRC signaling, a MAC-CE, a DCI message, and/or the like. Additionally, or alternatively, the network entity 105-*b* may transmit the criteria with the TDW configuration at 505 and/or with a TA command at 525.

At 525, the network entity 105-*b* may transmit, and/or output, a TA command to the UE 115-*c* during the TDW. The TA command may include a TA value for the UE to apply to signaling. The TA value may account for a time over which the signaling travels to a wireless device, such as to the network entity 105-*b* and/or a different network entity (e.g., a satellite if the network entity 105-*b* is a base station). The network entity 105-*b* may transmit the TA command in control signaling, such as a DCI message, and/or the like.

At 530, the UE 115-*c* may determine whether one or more parameters satisfy one or more criteria related to the parameters (e.g., parameter thresholds). For example, the parameters may include a TA value, an elevation angle between the UE 115-*c* and the network entity 105-*b*, a duration of the TDW, an measured values of a reference signal (e.g., RSRP), a cell type (e.g., LEO satellite), and/or any combination thereof. Similarly, the criteria may include a TA threshold, an elevation angle threshold, a duration threshold for the TDW, an RSRP threshold, one or more cell types, and/or any combination thereof.

In some cases, at 535, the UE 115-*c* may shift a transmission time by the TA value for the signaling based on the parameters satisfying the criteria (e.g., a TA value being above a threshold, an elevation angle between the UE 115-*c* and the network entity 105-*b* being above a threshold, a duration of the TDW being above a threshold, an RSRP satisfying a threshold, a cell type being a LEO satellite, and/or any combination thereof).

In some other cases, at 540, the UE 115-*c* may be capable of maintaining a transmit power and a phase continuity across one or more uplink channel transmissions in the TDW. That is, the UE 115-*c* may perform the DMRS bundling during the TDW. At 545, the UE 115-*c* may refrain from shifting the transmission time (e.g., may not apply the TA value to a transmission) based on the parameters satisfying the criteria (e.g., a TA value being less than and/or equal to a threshold, an elevation angle between the UE 115-*c* and the network entity 105-*b* being less than and/or equal to a threshold, a duration of the TDW being less than and/or equal to a threshold, an RSRP satisfying a threshold, a cell type being a GEO satellite, and/or any combination thereof).

At 550, the network entity 105-*b* may perform a joint channel estimation procedure during the TDW based on the UE 115-*c* maintaining the transmit power and the phase continuity for a continuous wave transmission during the TDW. For example, the network entity 105-*b* may perform the joint channel estimation procedure across two or more uplink channel transmissions from the UE 115-*c*.

At 555, the UE 115-*c* may transmit an uplink message (e.g., signaling) to the network entity 105-*b* during the TDW. The signaling may include an uplink transmission shifted by the TA value and/or the uplink transmissions (e.g., a continuous wave transmission) across the TDW in accordance with the transmit power and phase continuity for joint channel estimation based on whether the parameters satisfy the criteria for the TA adjustment and/or for the joint channel estimation, respectively. If the UE 115-*c* refrains from shifting the transmission time for a transmission according to the TA value, the UE 115-*c* may send the transmission to the network entity 105-*b* after the TDW (e.g., after the joint channel estimation at the network entity 105-*b*).

Figure 6:
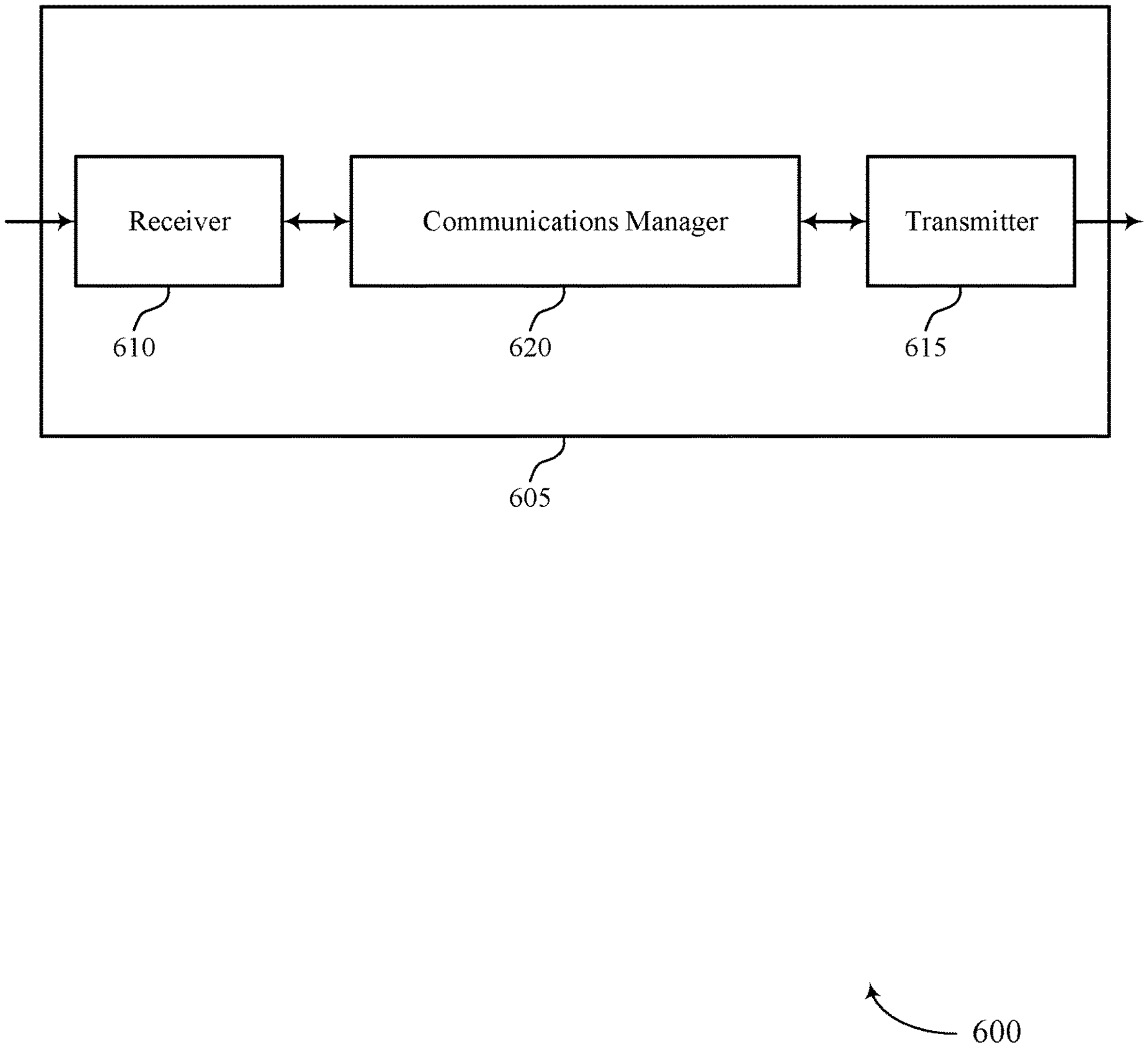
FIGS. 6 and 7 show block diagrams of devices that support priority-based TA adjustment in accordance with one or more aspects of the present disclosure.

FIG. 6 shows a block diagram 600 of a device 605 that supports priority-based TA adjustment in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to priority-based TA adjustment). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to priority-based TA adjustment). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of priority-based TA adjustment as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving a first message indicating a TDW configuration including a start of a TDW and a length of the TDW, the TDW configuration associated with joint channel estimation for the UE. The communications manager 620 may be configured as or otherwise support a means for receiving, during the TDW and based on the TDW configuration, a second message including a TA command, the TA command indicating a TA value for the UE. The communications manager 620 may be configured as or otherwise support a means for transmitting, during the TDW, a third message in accordance with the TA value based on one or more parameters satisfying one or more criteria associated with the one or more parameters, the one or more parameters associated with the UE.

Additionally, or alternatively, the communications manager 620 may support wireless communication at a UE in accordance with examples as disclosed herein. For example, the communications manager 620 may be configured as or otherwise support a means for receiving a first message indicating a TDW configuration including a start of a TDW and a length of the TDW, the TDW configuration associated with joint channel estimation for the UE. The communications manager 620 may be configured as or otherwise support a means for receiving, during the TDW and based on the TDW configuration, a second message including a TA command, the TA command indicating a TA value for the UE. The communications manager 620 may be configured as or otherwise support a means for transmitting, during the TDW, a third message independent of the TA value based on one or more parameters satisfying one or more criteria associated with the one or more parameters, the one or more parameters associated with the UE.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for a UE prioritizing maintaining a transmit power and a phase continuity for a joint channel estimation or prioritizing a TA adjustment based on one or more parameters satisfying criteria, which may provide for reduced processing, reduced power consumption, more efficient utilization of communication resources, and the like.

Figure 7:
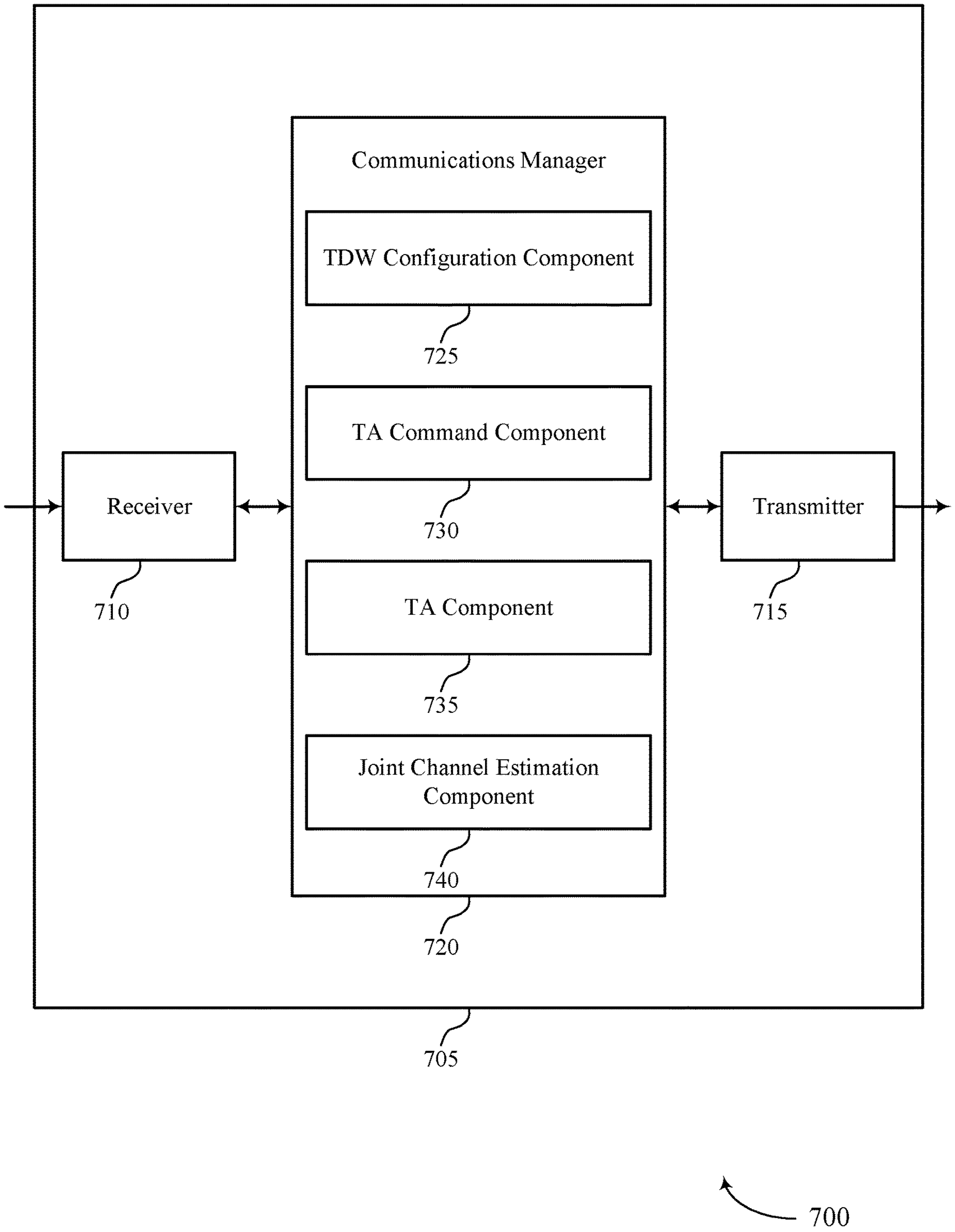

FIG. 7 shows a block diagram 700 of a device 705 that supports priority-based TA adjustment in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to priority-based TA adjustment). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to priority-based TA adjustment). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of priority-based TA adjustment as described herein. For example, the communications manager 720 may include a TDW configuration component 725, a TA command component 730, a TA component 735, a joint channel estimation component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The TDW configuration component 725 may be configured as or otherwise support a means for receiving a first message indicating a TDW configuration including a start of a TDW and a length of the TDW, the TDW configuration associated with joint channel estimation for the UE. The TA command component 730 may be configured as or otherwise support a means for receiving, during the TDW and based on the TDW configuration, a second message including a TA command, the TA command indicating a TA value for the UE. The TA component 735 may be configured as or otherwise support a means for transmitting, during the TDW, a third message in accordance with the TA value based on one or more parameters satisfying one or more criteria associated with the one or more parameters, the one or more parameters associated with the UE.

Additionally, or alternatively, the communications manager 720 may support wireless communication at a UE in accordance with examples as disclosed herein. The TDW configuration component 725 may be configured as or otherwise support a means for receiving a first message indicating a TDW configuration including a start of a TDW and a length of the TDW, the TDW configuration associated with joint channel estimation for the UE. The TA command component 730 may be configured as or otherwise support a means for receiving, during the TDW and based on the TDW configuration, a second message including a TA command, the TA command indicating a TA value for the UE. The joint channel estimation component 740 may be configured as or otherwise support a means for transmitting, during the TDW, a third message independent of the TA value based on one or more parameters satisfying one or more criteria associated with the one or more parameters, the one or more parameters associated with the UE.

Figure 8:
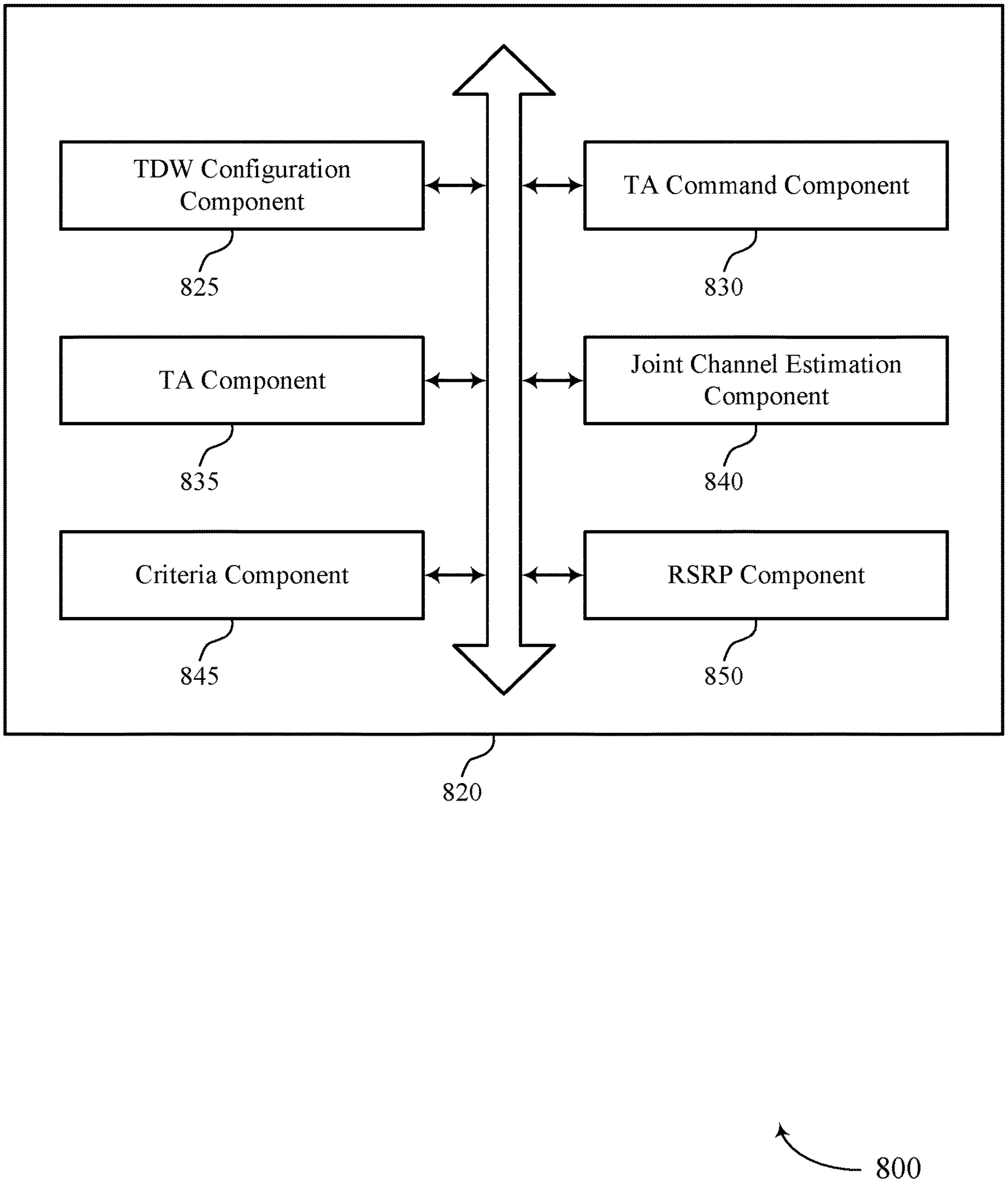
FIG. 8 shows a block diagram of a communications manager that supports priority-based TA adjustment in accordance with one or more aspects of the present disclosure.

FIG. 8 shows a block diagram 800 of a communications manager 820 that supports priority-based TA adjustment in accordance with one or more aspects of the present disclosure. The communications manager 820 may be an example of aspects of a communications manager 620, a communications manager 720, or both, as described herein. The communications manager 820, or various components thereof, may be an example of means for performing various aspects of priority-based TA adjustment as described herein. For example, the communications manager 820 may include a TDW configuration component 825, a TA command component 830, a TA component 835, a joint channel estimation component 840, a criteria component 845, an RSRP component 850, or any combination thereof. Each of these components may communicate, directly or indirectly, with one another (e.g., via one or more buses).

The communications manager 820 may support wireless communication at a UE in accordance with examples as disclosed herein. The TDW configuration component 825 may be configured as or otherwise support a means for receiving a first message indicating a TDW configuration including a start of a TDW and a length of the TDW, the TDW configuration associated with joint channel estimation for the UE. The TA command component 830 may be configured as or otherwise support a means for receiving, during the TDW and based on the TDW configuration, a second message including a TA command, the TA command indicating a TA value for the UE. The TA component 835 may be configured as or otherwise support a means for transmitting, during the TDW, a third message in accordance with the TA value based on one or more parameters satisfying one or more criteria associated with the one or more parameters, the one or more parameters associated with the UE.

In some examples, the TA component 835 may be configured as or otherwise support a means for transmitting the third message according to a transmission time that is shifted in time based on the TA value.

In some examples, the criteria component 845 may be configured as or otherwise support a means for receiving a control message indicating the one or more criteria, where the third message is transmitted based on the control message.

In some examples, the criteria component 845 may be configured as or otherwise support a means for receiving an RRC message, a MAC-CE, or DCI.

In some examples, the one or more parameters include the TA value. In some examples, the one or more criteria include a TA threshold.

In some examples, the one or more parameters include an elevation angle between the UE and a network entity. In some examples, the one or more criteria include an elevation angle threshold.

In some examples, the one or more parameters include a duration of the TDW. In some examples, the one or more criteria include a TDW threshold duration.

In some examples, the RSRP component 850 may be configured as or otherwise support a means for measuring a RSRP associated with one or more reference signals. In some examples, the RSRP component 850 may be configured as or otherwise support a means for transmitting, prior to the TDW, a report including the measured RSRP. In some examples, the TA component 835 may be configured as or otherwise support a means for the one or more parameters include the measured RSRP. In some examples, the criteria component 845 may be configured as or otherwise support a means for the one or more criteria include a RSRP threshold.

In some examples, the one or more parameters include a cell type. In some examples, the one or more criteria include one or more cell types including the cell type.

In some examples, the UE is operating in an NTN.

Additionally, or alternatively, the communications manager 820 may support wireless communication at a UE in accordance with examples as disclosed herein. In some examples, the TDW configuration component 825 may be configured as or otherwise support a means for receiving a first message indicating a TDW configuration including a start of a TDW and a length of the TDW, the TDW configuration associated with joint channel estimation for the UE. In some examples, the TA command component 830 may be configured as or otherwise support a means for receiving, during the TDW and based on the TDW configuration, a second message including a TA command, the TA command indicating a TA value for the UE. The joint channel estimation component 840 may be configured as or otherwise support a means for transmitting, during the TDW, a third message independent of the TA value based on one or more parameters satisfying one or more criteria associated with the one or more parameters, the one or more parameters associated with the UE.

In some examples, the joint channel estimation component 840 may be configured as or otherwise support a means for maintaining a transmit power and a phase continuity across one or more uplink channel transmissions, where the third message includes the one or more uplink channel transmissions. In some examples, the TA component 835 may be configured as or otherwise support a means for refraining from shifting a transmission time for the third message in accordance with the TA value.

In some examples, the criteria component 845 may be configured as or otherwise support a means for receiving a control message indicating the one or more criteria, where the third message is transmitted based on the control message.

In some examples, the criteria component 845 may be configured as or otherwise support a means for receiving a SIB message, DCI, a MAC-CE, or an RRC message.

In some examples, the one or more parameters include the TA value. In some examples, the one or more criteria include a TA threshold.

In some examples, the one or more parameters include an elevation angle between the UE and a network entity. In some examples, the one or more criteria include an elevation angle threshold.

In some examples, the one or more parameters include a duration of the TDW. In some examples, the one or more criteria include a TDW threshold duration.

In some examples, the RSRP component 850 may be configured as or otherwise support a means for measuring a RSRP associated with one or more reference signals. In some examples, the RSRP component 850 may be configured as or otherwise support a means for transmitting, prior to the TDW, a report including the measured RSRP. In some examples, the TA component 835 may be configured as or otherwise support a means for the one or more parameters include the measured RSRP. In some examples, the criteria component 845 may be configured as or otherwise support a means for the one or more criteria include a RSRP threshold.

In some examples, the one or more parameters include a cell type. In some examples, the one or more criteria include one or more cell types including the cell type.

In some examples, the UE is operating in an NTN.

Figure 9:
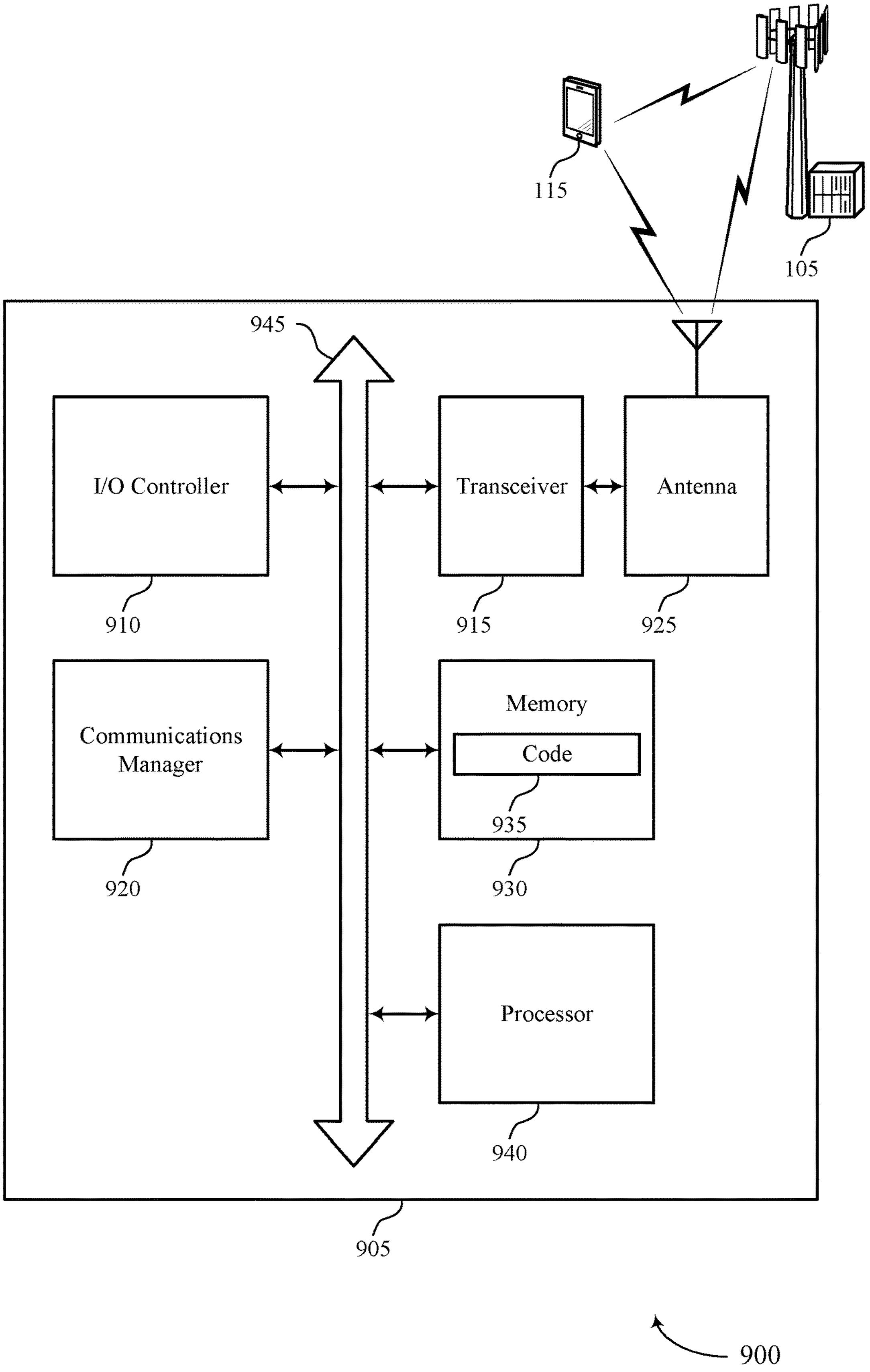
FIG. 9 shows a diagram of a system including a device that supports priority-based TA adjustment in accordance with one or more aspects of the present disclosure.

FIG. 9 shows a diagram of a system 900 including a device 905 that supports priority-based TA adjustment in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting priority-based TA adjustment). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving a first message indicating a TDW configuration including a start of a TDW and a length of the TDW, the TDW configuration associated with joint channel estimation for the UE. The communications manager 920 may be configured as or otherwise support a means for receiving, during the TDW and based on the TDW configuration, a second message including a TA command, the TA command indicating a TA value for the UE. The communications manager 920 may be configured as or otherwise support a means for transmitting, during the TDW, a third message in accordance with the TA value based on one or more parameters satisfying one or more criteria associated with the one or more parameters, the one or more parameters associated with the UE.

Additionally, or alternatively, the communications manager 920 may support wireless communication at a UE in accordance with examples as disclosed herein. For example, the communications manager 920 may be configured as or otherwise support a means for receiving a first message indicating a TDW configuration including a start of a TDW and a length of the TDW, the TDW configuration associated with joint channel estimation for the UE. The communications manager 920 may be configured as or otherwise support a means for receiving, during the TDW and based on the TDW configuration, a second message including a TA command, the TA command indicating a TA value for the UE. The communications manager 920 may be configured as or otherwise support a means for transmitting, during the TDW, a third message independent of the TA value based on one or more parameters satisfying one or more criteria associated with the one or more parameters, the one or more parameters associated with the UE.

By including or configuring the communications manager 920 in accordance with examples as described herein, the device 905 may support techniques for a UE prioritizing maintaining a transmit power and a phase continuity for a joint channel estimation or prioritizing a TA adjustment based on one or more parameters satisfying criteria, which may provide for improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of priority-based TA adjustment as described herein, or the processor 940 and the memory 930 may be otherwise configured to perform or support such operations.

Figure 10:
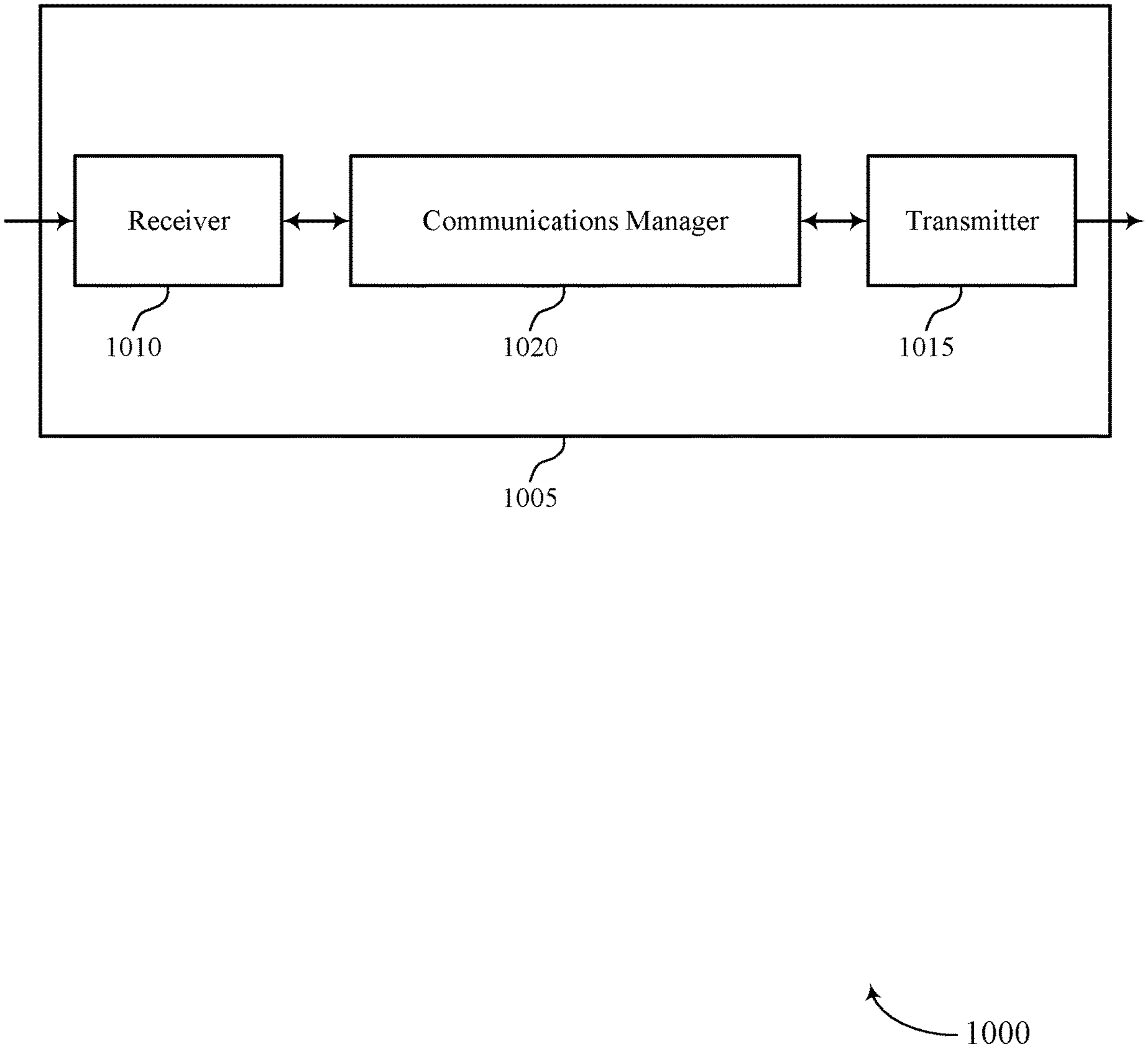
FIGS. 10 and 11 show block diagrams of devices that support priority-based TA adjustment in accordance with one or more aspects of the present disclosure.

FIG. 10 shows a block diagram 1000 of a device 1005 that supports priority-based TA adjustment in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of priority-based TA adjustment as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for outputting a first message indicating a TDW configuration including a start of a TDW and a length of the TDW, the TDW configuration associated with joint channel estimation for a UE. The communications manager 1020 may be configured as or otherwise support a means for outputting, during the TDW and based on the TDW configuration, a second message including a TA command, the TA command indicating a TA value for the UE. The communications manager 1020 may be configured as or otherwise support a means for obtaining, during the TDW, a third message in accordance with the TA value based on one or more parameters satisfying one or more criteria associated with the one or more parameters, the one or more parameters associated with the UE.

Additionally, or alternatively, the communications manager 1020 may support wireless communication at a network entity in accordance with examples as disclosed herein. For example, the communications manager 1020 may be configured as or otherwise support a means for outputting a first message indicating a TDW configuration including a start of a TDW and a length of the TDW, the TDW configuration associated with joint channel estimation for a UE. The communications manager 1020 may be configured as or otherwise support a means for outputting, during the TDW and based on the TDW configuration, a second message including a TA command, the TA command indicating a TA value for the UE. The communications manager 1020 may be configured as or otherwise support a means for obtaining, during the TDW, a third message independent of the TA value based on one or more parameters satisfying one or more criteria associated with the one or more parameters, the one or more parameters associated with the UE.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for a UE prioritizing maintaining a transmit power and a phase continuity for a joint channel estimation or prioritizing a TA adjustment based on one or more parameters satisfying criteria, which may provide for reduced processing, reduced power consumption, more efficient utilization of communication resources, and the like.

Figure 11:
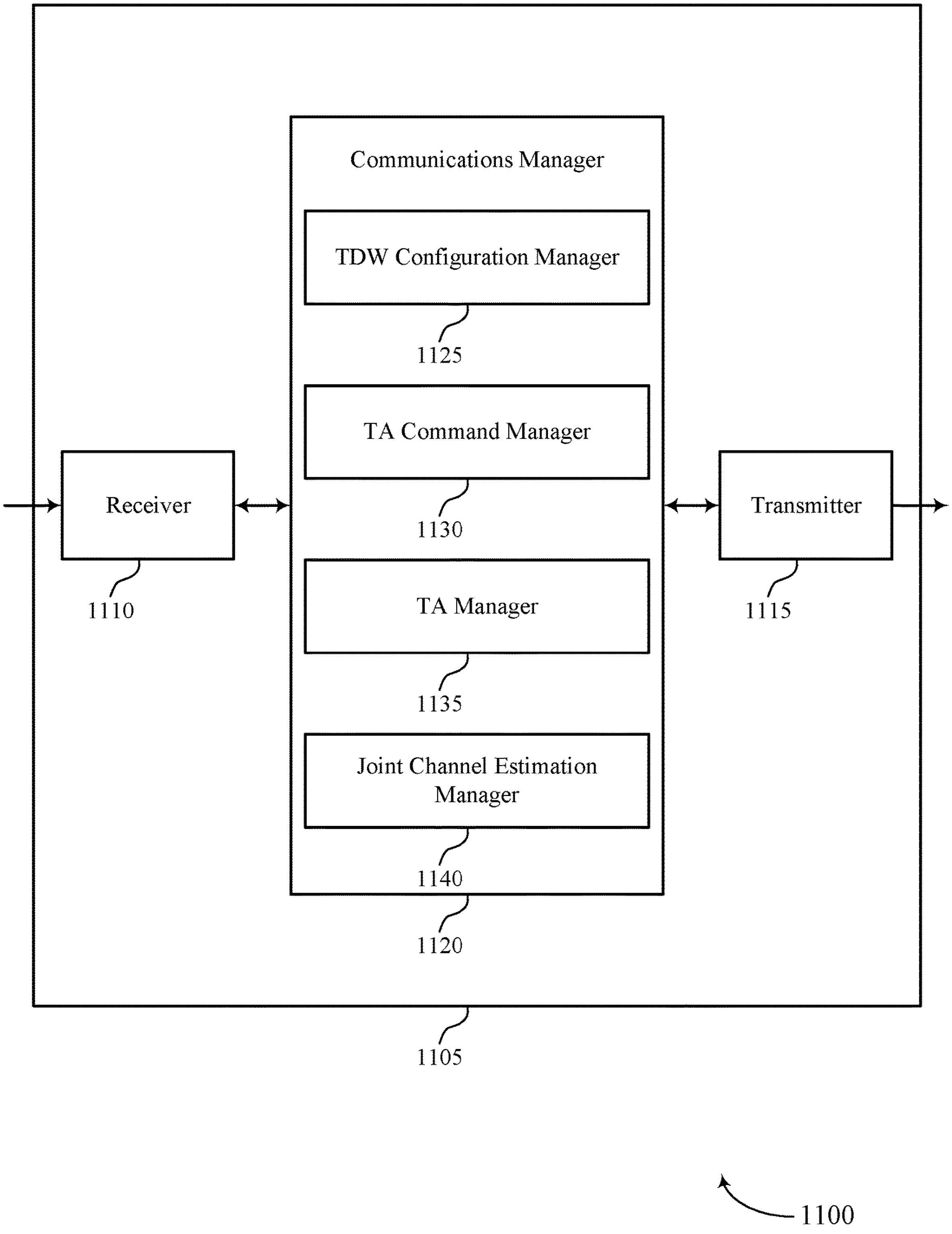

FIG. 11 shows a block diagram 1100 of a device 1105 that supports priority-based TA adjustment in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of priority-based TA adjustment as described herein. For example, the communications manager 1120 may include a TDW configuration manager 1125, a TA command manager 1130, a TA manager 1135, a joint channel estimation manager 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The TDW configuration manager 1125 may be configured as or otherwise support a means for outputting a first message indicating a TDW configuration including a start of a TDW and a length of the TDW, the TDW configuration associated with joint channel estimation for a UE. The TA command manager 1130 may be configured as or otherwise support a means for outputting, during the TDW and based on the TDW configuration, a second message including a TA command, the TA command indicating a TA value for the UE. The TA manager 1135 may be configured as or otherwise support a means for obtaining, during the TDW, a third message in accordance with the TA value based on one or more parameters satisfying one or more criteria associated with the one or more parameters, the one or more parameters associated with the UE.

Additionally, or alternatively, the communications manager 1120 may support wireless communication at a network entity in accordance with examples as disclosed herein. The TDW configuration manager 1125 may be configured as or otherwise support a means for outputting a first message indicating a TDW configuration including a start of a TDW and a length of the TDW, the TDW configuration associated with joint channel estimation for a UE. The TA command manager 1130 may be configured as or otherwise support a means for outputting, during the TDW and based on the TDW configuration, a second message including a TA command, the TA command indicating a TA value for the UE. The joint channel estimation manager 1140 may be configured as or otherwise support a means for obtaining, during the TDW, a third message independent of the TA value based on one or more parameters satisfying one or more criteria associated with the one or more parameters, the one or more parameters associated with the UE.

Figure 12:
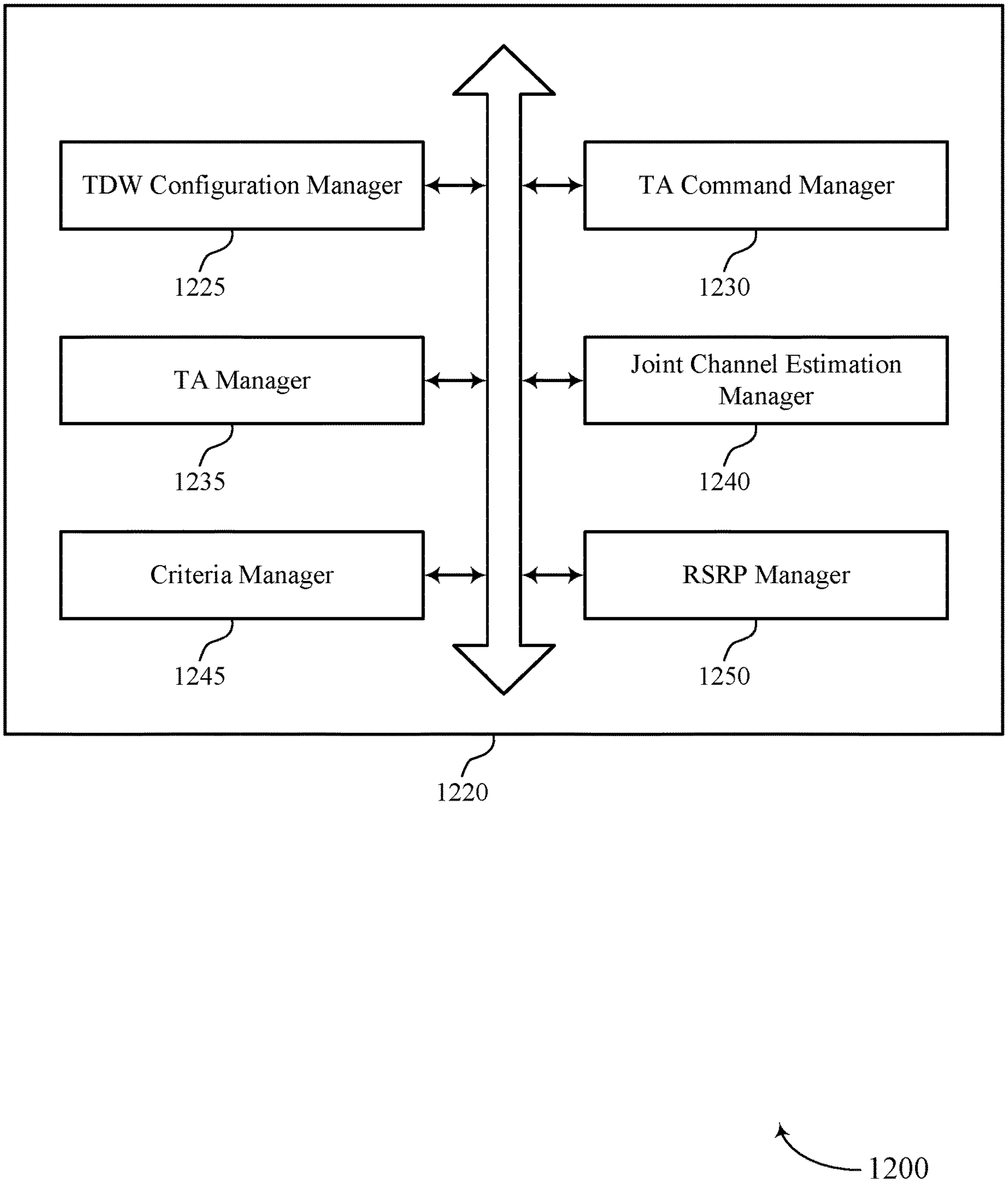
FIG. 12 shows a block diagram of a communications manager that supports priority-based TA adjustment in accordance with one or more aspects of the present disclosure.

FIG. 12 shows a block diagram 1200 of a communications manager 1220 that supports priority-based TA adjustment in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of priority-based TA adjustment as described herein. For example, the communications manager 1220 may include a TDW configuration manager 1225, a TA command manager 1230, a TA manager 1235, a joint channel estimation manager 1240, a criteria manager 1245, an RSRP manager 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The TDW configuration manager 1225 may be configured as or otherwise support a means for outputting a first message indicating a TDW configuration including a start of a TDW and a length of the TDW, the TDW configuration associated with joint channel estimation for a UE. The TA command manager 1230 may be configured as or otherwise support a means for outputting, during the TDW and based on the TDW configuration, a second message including a TA command, the TA command indicating a TA value for the UE. The TA manager 1235 may be configured as or otherwise support a means for obtaining, during the TDW, a third message in accordance with the TA value based on one or more parameters satisfying one or more criteria associated with the one or more parameters, the one or more parameters associated with the UE.

In some examples, the TA manager 1235 may be configured as or otherwise support a means for obtaining the third message according to a transmission time that is shifted in time based on the TA value.

In some examples, the criteria manager 1245 may be configured as or otherwise support a means for outputting a control message indicating the one or more criteria, where the third message is obtained based on the control message.

In some examples, the criteria manager 1245 may be configured as or otherwise support a means for outputting an RRC message, a MAC-CE, or DCI.

In some examples, the one or more parameters include the TA value. In some examples, the one or more criteria include a TA threshold.

In some examples, the one or more parameters include an elevation angle between the UE and the network entity. In some examples, the one or more criteria include an elevation angle threshold.

In some examples, the one or more parameters include a duration of the TDW. In some examples, the one or more criteria include a TDW threshold duration.

In some examples, the RSRP manager 1250 may be configured as or otherwise support a means for obtaining, prior to the TDW, a report including a measured RSRP. In some examples, the TA manager 1235 may be configured as or otherwise support a means for the one or more parameters include the measured RSRP. In some examples, the criteria manager 1245 may be configured as or otherwise support a means for the one or more criteria include a RSRP threshold.

In some examples, the one or more parameters include a cell type. In some examples, the one or more criteria include one or more cell types including the cell type.

In some examples, the network entity is operating in an NTN.

Additionally, or alternatively, the communications manager 1220 may support wireless communication at a network entity in accordance with examples as disclosed herein. In some examples, the TDW configuration manager 1225 may be configured as or otherwise support a means for outputting a first message indicating a TDW configuration including a start of a TDW and a length of the TDW, the TDW configuration associated with joint channel estimation for a UE. In some examples, the TA command manager 1230 may be configured as or otherwise support a means for outputting, during the TDW and based on the TDW configuration, a second message including a TA command, the TA command indicating a TA value for the UE. The joint channel estimation manager 1240 may be configured as or otherwise support a means for obtaining, during the TDW, a third message independent of the TA value based on one or more parameters satisfying one or more criteria associated with the one or more parameters, the one or more parameters associated with the UE.

In some examples, the joint channel estimation manager 1240 may be configured as or otherwise support a means for performing a joint channel estimation procedure across two or more uplink channel transmissions, where the third message includes the two or more uplink channel transmissions.

In some examples, the criteria manager 1245 may be configured as or otherwise support a means for outputting a control message indicating the one or more criteria, where the third message is received based on the control message.

In some examples, the criteria manager 1245 may be configured as or otherwise support a means for outputting a SIB message, DCI, a MAC-CE, or an RRC message.

In some examples, the one or more parameters include the TA value. In some examples, the one or more criteria include a TA threshold.

In some examples, the one or more parameters include an elevation angle between the UE and the network entity. In some examples, the one or more criteria include an elevation angle threshold.

In some examples, the one or more parameters include a duration of the TDW. In some examples, the one or more criteria include a TDW threshold duration.

In some examples, the RSRP manager 1250 may be configured as or otherwise support a means for obtaining, prior to the TDW, a report including a measured RSRP. In some examples, the TA manager 1235 may be configured as or otherwise support a means for the one or more parameters include the measured RSRP. In some examples, the criteria manager 1245 may be configured as or otherwise support a means for the one or more criteria include a RSRP threshold.

In some examples, the one or more parameters include a cell type. In some examples, the one or more criteria include one or more cell types including the cell type.

In some examples, the network entity is operating in an NTN.

Figure 13:
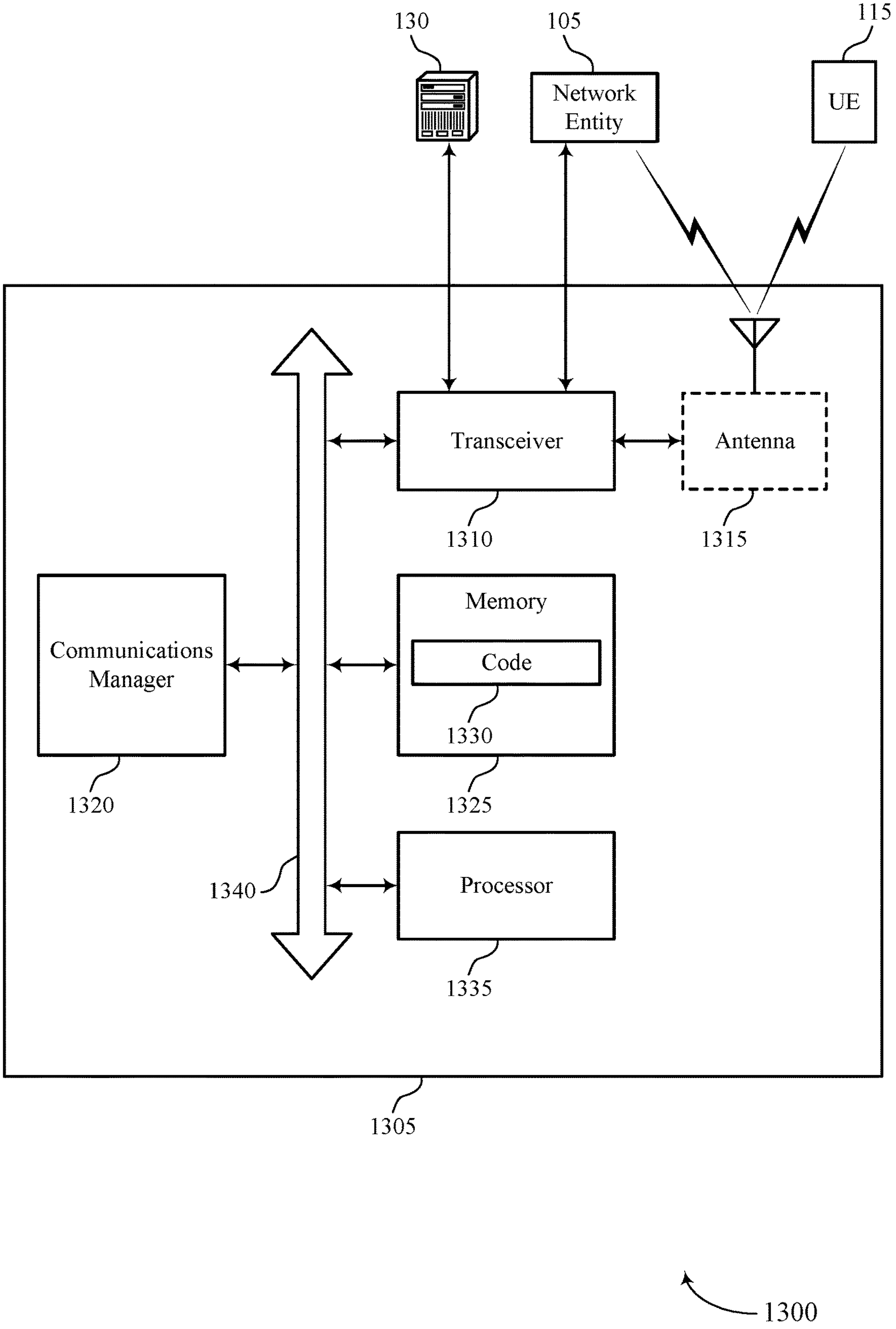
FIG. 13 shows a diagram of a system including a device that supports priority-based TA adjustment in accordance with one or more aspects of the present disclosure.

FIG. 13 shows a diagram of a system 1300 including a device 1305 that supports priority-based TA adjustment in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting priority-based TA adjustment). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for outputting a first message indicating a TDW configuration including a start of a TDW and a length of the TDW, the TDW configuration associated with joint channel estimation for a UE. The communications manager 1320 may be configured as or otherwise support a means for outputting, during the TDW and based on the TDW configuration, a second message including a TA command, the TA command indicating a TA value for the UE. The communications manager 1320 may be configured as or otherwise support a means for obtaining, during the TDW, a third message in accordance with the TA value based on one or more parameters satisfying one or more criteria associated with the one or more parameters, the one or more parameters associated with the UE.

Additionally, or alternatively, the communications manager 1320 may support wireless communication at a network entity in accordance with examples as disclosed herein. For example, the communications manager 1320 may be configured as or otherwise support a means for outputting a first message indicating a TDW configuration including a start of a TDW and a length of the TDW, the TDW configuration associated with joint channel estimation for a UE. The communications manager 1320 may be configured as or otherwise support a means for outputting, during the TDW and based on the TDW configuration, a second message including a TA command, the TA command indicating a TA value for the UE. The communications manager 1320 may be configured as or otherwise support a means for obtaining, during the TDW, a third message independent of the TA value based on one or more parameters satisfying one or more criteria associated with the one or more parameters, the one or more parameters associated with the UE.

By including or configuring the communications manager 1320 in accordance with examples as described herein, the device 1305 may support techniques for a UE prioritizing maintaining a transmit power and a phase continuity for a joint channel estimation or prioritizing a TA adjustment based on one or more parameters satisfying criteria, which may provide for improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of priority-based TA adjustment as described herein, or the processor 1335 and the memory 1325 may be otherwise configured to perform or support such operations.

Figure 14:
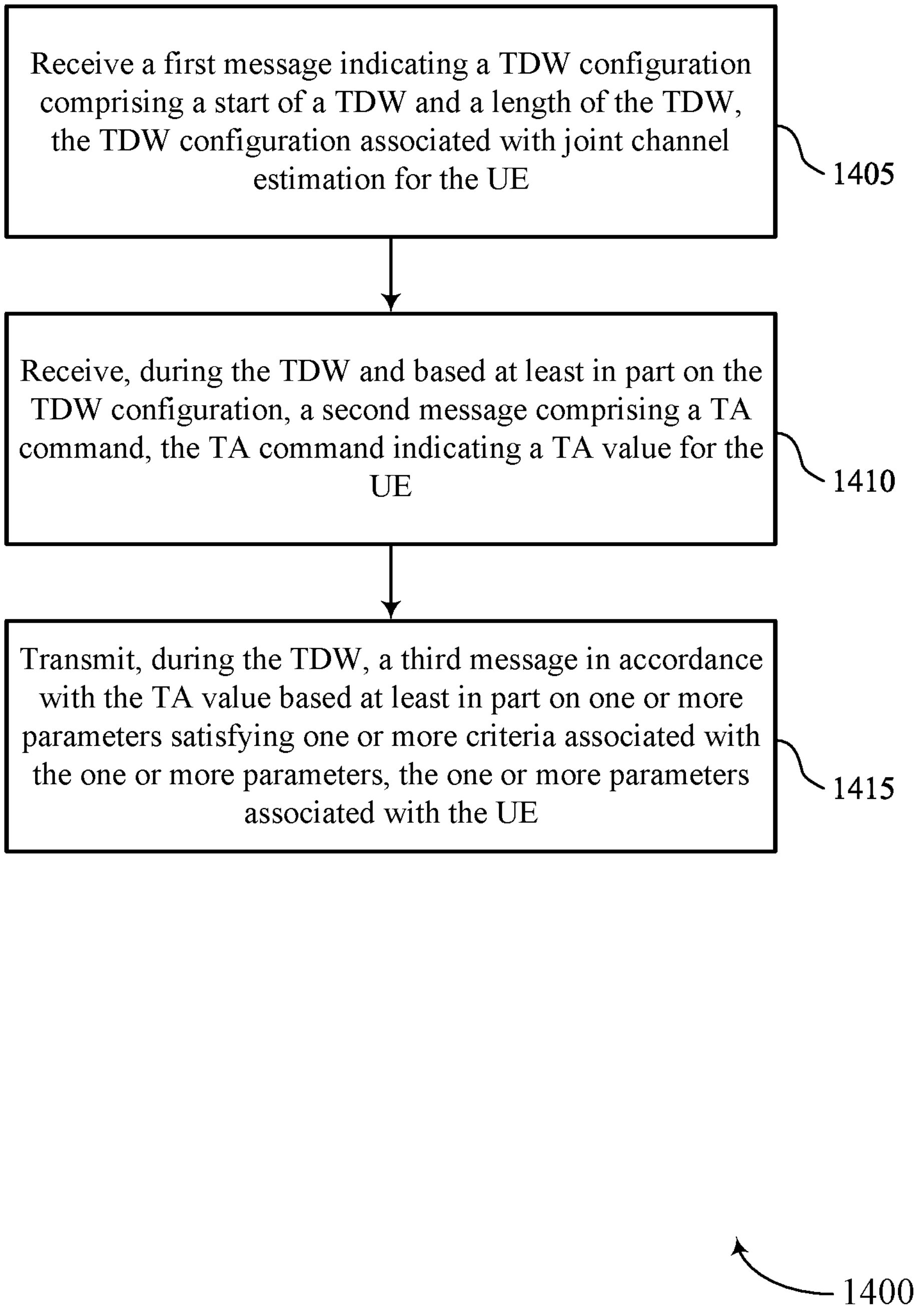
FIGS. 14 through 22 show flowcharts illustrating methods that support priority-based TA adjustment in accordance with one or more aspects of the present disclosure.

FIG. 14 shows a flowchart illustrating a method 1400 that supports priority-based TA adjustment in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a first message indicating a TDW configuration including a start of a TDW and a length of the TDW, the TDW configuration associated with joint channel estimation for the UE. The operations of 1405 may be performed in accordance with examples as disclosed herein. In some examples, aspects of the operations of 1405 may be performed by a TDW configuration component 825 as described with reference to FIG. 8.

At 1410, the method may include receiving, during the TDW and based on the TDW configuration, a second message including a TA command, the TA command indicating a TA value for the UE. The operations of 1410 may be performed in accordance with examples as disclosed herein. In some examples, aspects of the operations of 1410 may be performed by a TA command component 830 as described with reference to FIG. 8.

At 1415, the method may include transmitting, during the TDW, a third message in accordance with the TA value based on one or more parameters satisfying one or more criteria associated with the one or more parameters, the one or more parameters associated with the UE. The operations of 1415 may be performed in accordance with examples as disclosed herein. In some examples, aspects of the operations of 1415 may be performed by a TA component 835 as described with reference to FIG. 8.

Figure 15:
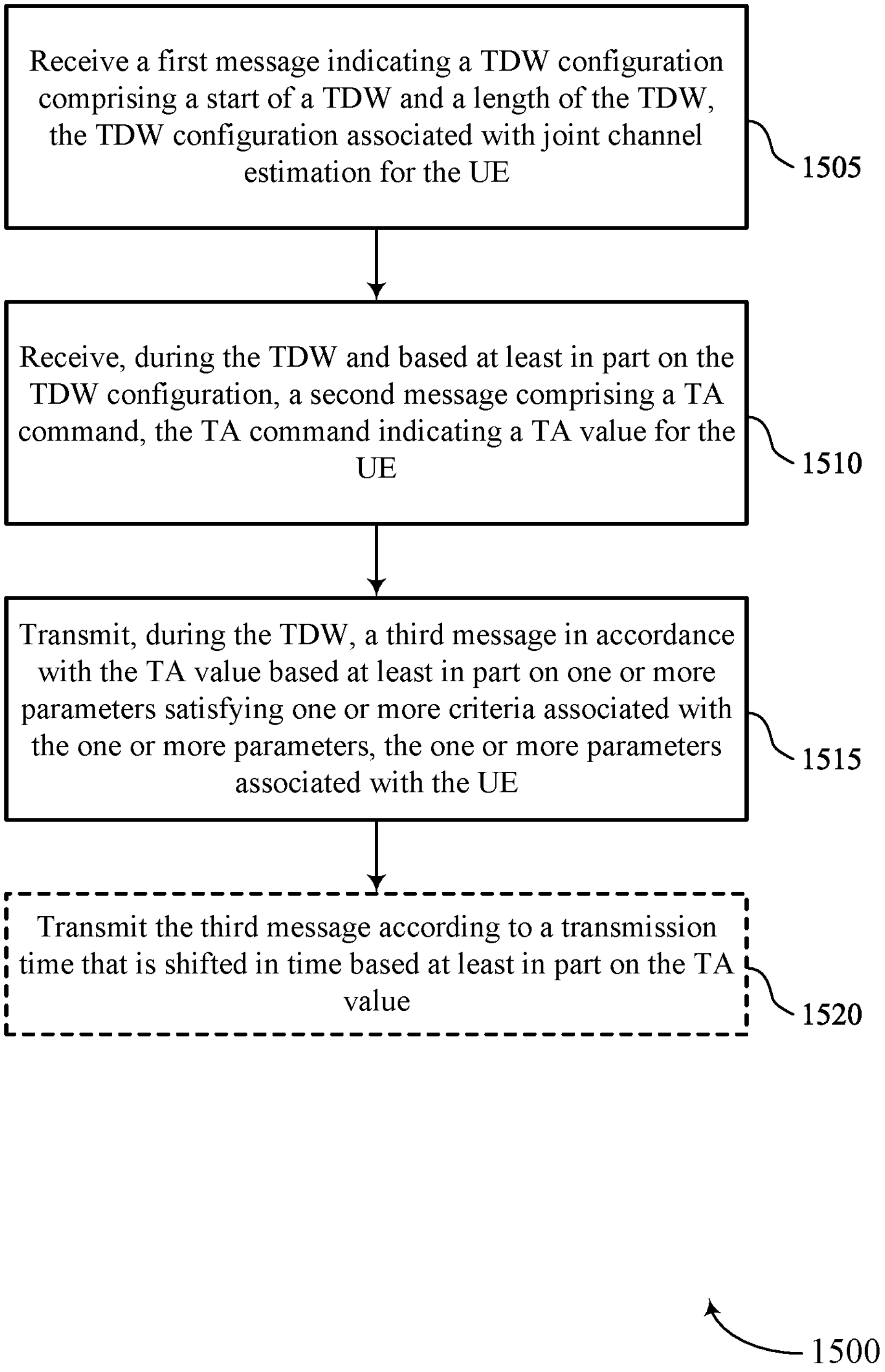

FIG. 15 shows a flowchart illustrating a method 1500 that supports priority-based TA adjustment in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a first message indicating a TDW configuration including a start of a TDW and a length of the TDW, the TDW configuration associated with joint channel estimation for the UE. The operations of 1505 may be performed in accordance with examples as disclosed herein. In some examples, aspects of the operations of 1505 may be performed by a TDW configuration component 825 as described with reference to FIG. 8.

At 1510, the method may include receiving, during the TDW and based on the TDW configuration, a second message including a TA command, the TA command indicating a TA value for the UE. The operations of 1510 may be performed in accordance with examples as disclosed herein. In some examples, aspects of the operations of 1510 may be performed by a TA command component 830 as described with reference to FIG. 8.

At 1515, the method may include transmitting, during the TDW, a third message in accordance with the TA value based on one or more parameters satisfying one or more criteria associated with the one or more parameters, the one or more parameters associated with the UE. The operations of 1515 may be performed in accordance with examples as disclosed herein. In some examples, aspects of the operations of 1515 may be performed by a TA component 835 as described with reference to FIG. 8.

At 1520, the method may include transmitting the third message according to a transmission time that is shifted in time based on the TA value. The operations of 1520 may be performed in accordance with examples as disclosed herein. In some examples, aspects of the operations of 1520 may be performed by a TA component 835 as described with reference to FIG. 8.

Figure 16:
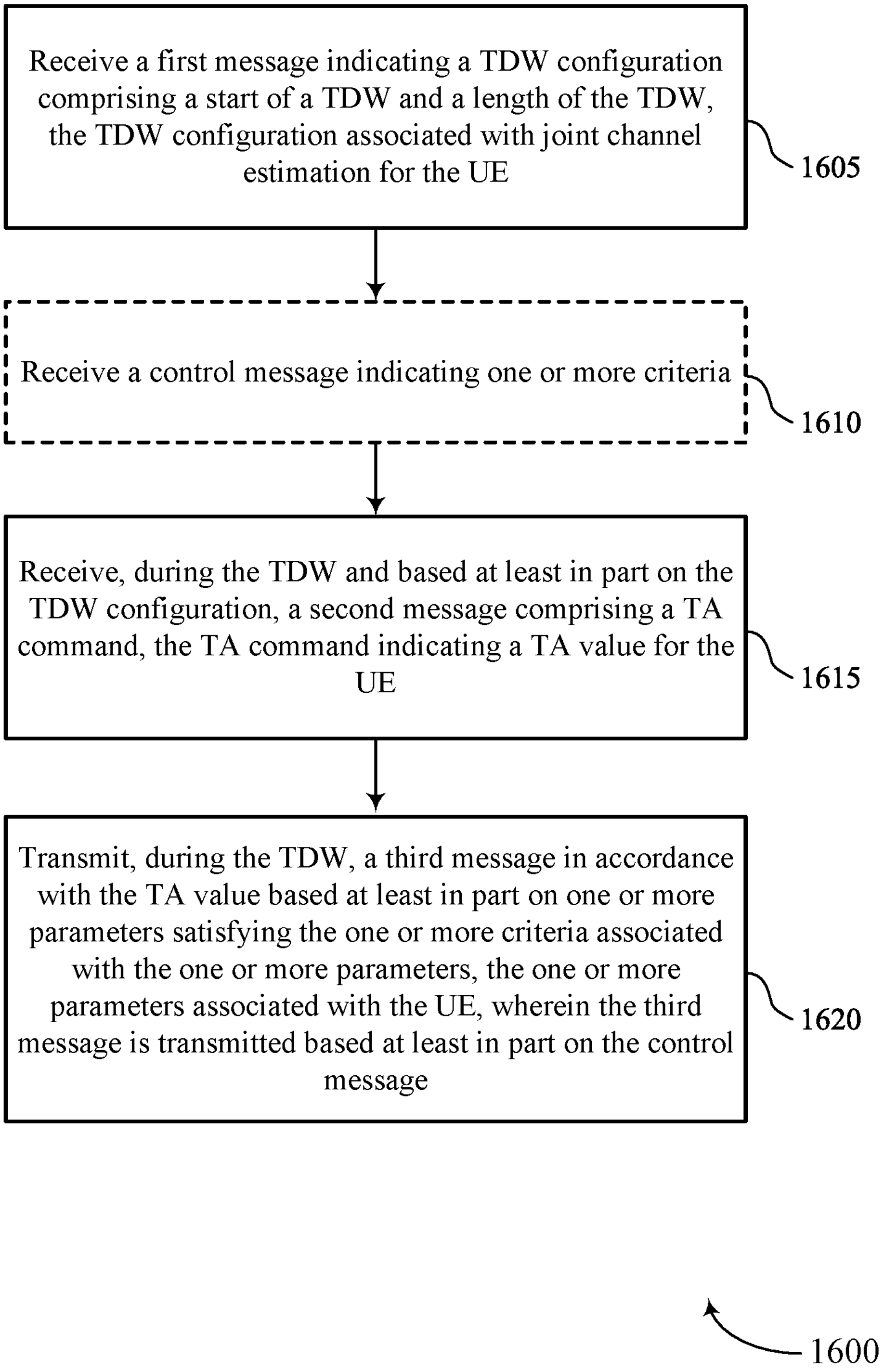

FIG. 16 shows a flowchart illustrating a method 1600 that supports priority-based TA adjustment in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving a first message indicating a TDW configuration including a start of a TDW and a length of the TDW, the TDW configuration associated with joint channel estimation for the UE. The operations of 1605 may be performed in accordance with examples as disclosed herein. In some examples, aspects of the operations of 1605 may be performed by a TDW configuration component 825 as described with reference to FIG. 8.

At 1610, the method may include receiving a control message indicating one or more criteria. The operations of 1610 may be performed in accordance with examples as disclosed herein. In some examples, aspects of the operations of 1610 may be performed by a criteria component 845 as described with reference to FIG. 8.

At 1615, the method may include receiving, during the TDW and based on the TDW configuration, a second message including a TA command, the TA command indicating a TA value for the UE. The operations of 1615 may be performed in accordance with examples as disclosed herein. In some examples, aspects of the operations of 1615 may be performed by a TA command component 830 as described with reference to FIG. 8.

At 1620, the method may include transmitting, during the TDW, a third message in accordance with the TA value based on one or more parameters satisfying one or more criteria associated with the one or more parameters, the one or more parameters associated with the UE, where the third message is transmitted based on the control message. The operations of 1620 may be performed in accordance with examples as disclosed herein. In some examples, aspects of the operations of 1620 may be performed by a TA component 835 as described with reference to FIG. 8.

Figure 17:
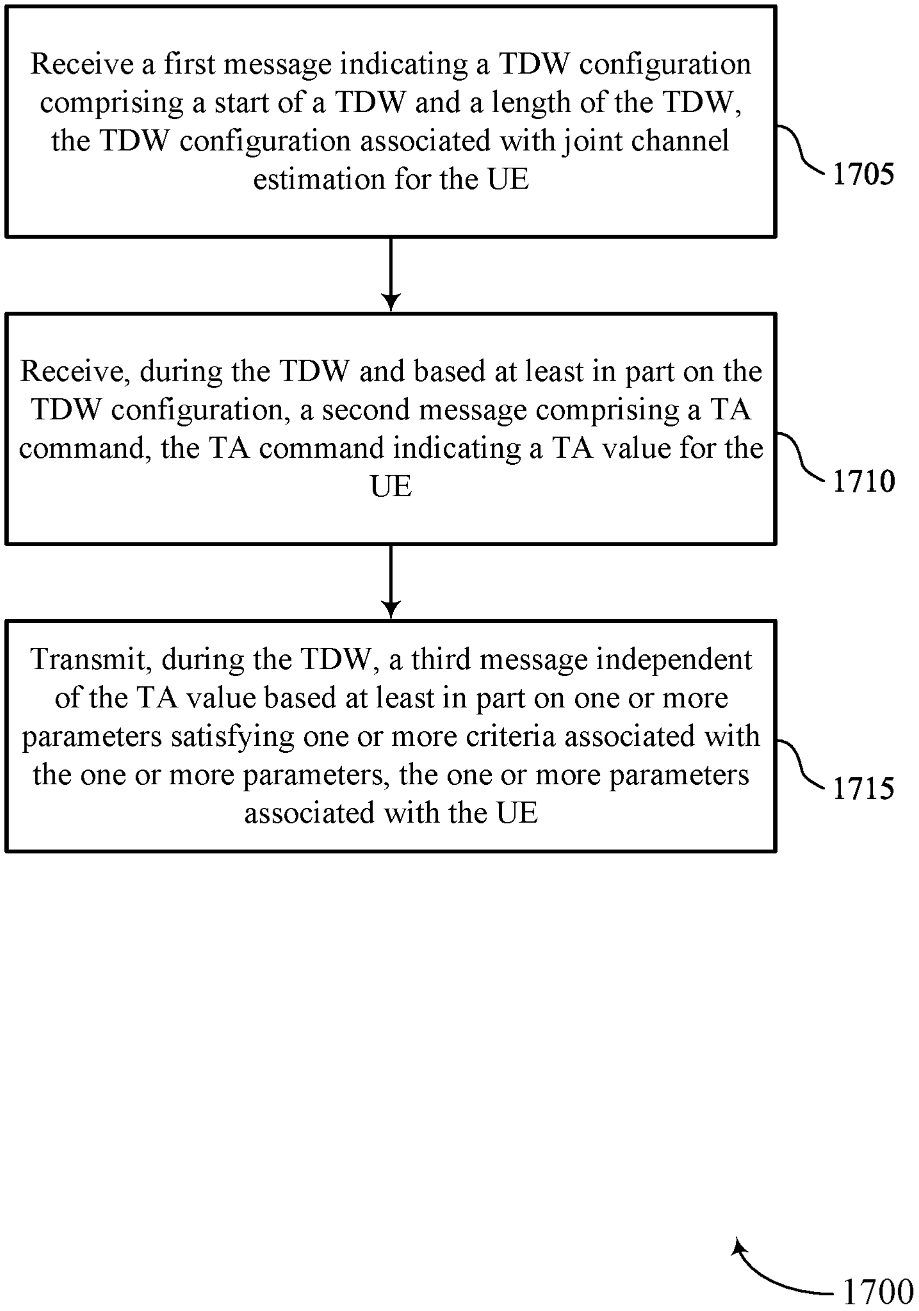

FIG. 17 shows a flowchart illustrating a method 1700 that supports priority-based TA adjustment in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include receiving a first message indicating a TDW configuration including a start of a TDW and a length of the TDW, the TDW configuration associated with joint channel estimation for the UE. The operations of 1705 may be performed in accordance with examples as disclosed herein. In some examples, aspects of the operations of 1705 may be performed by a TDW configuration component 825 as described with reference to FIG. 8.

At 1710, the method may include receiving, during the TDW and based on the TDW configuration, a second message including a TA command, the TA command indicating a TA value for the UE. The operations of 1710 may be performed in accordance with examples as disclosed herein. In some examples, aspects of the operations of 1710 may be performed by a TA command component 830 as described with reference to FIG. 8.

At 1715, the method may include transmitting, during the TDW, a third message independent of the TA value based on one or more parameters satisfying one or more criteria associated with the one or more parameters, the one or more parameters associated with the UE. The operations of 1715 may be performed in accordance with examples as disclosed herein. In some examples, aspects of the operations of 1715 may be performed by a joint channel estimation component 840 as described with reference to FIG. 8.

Figure 18:
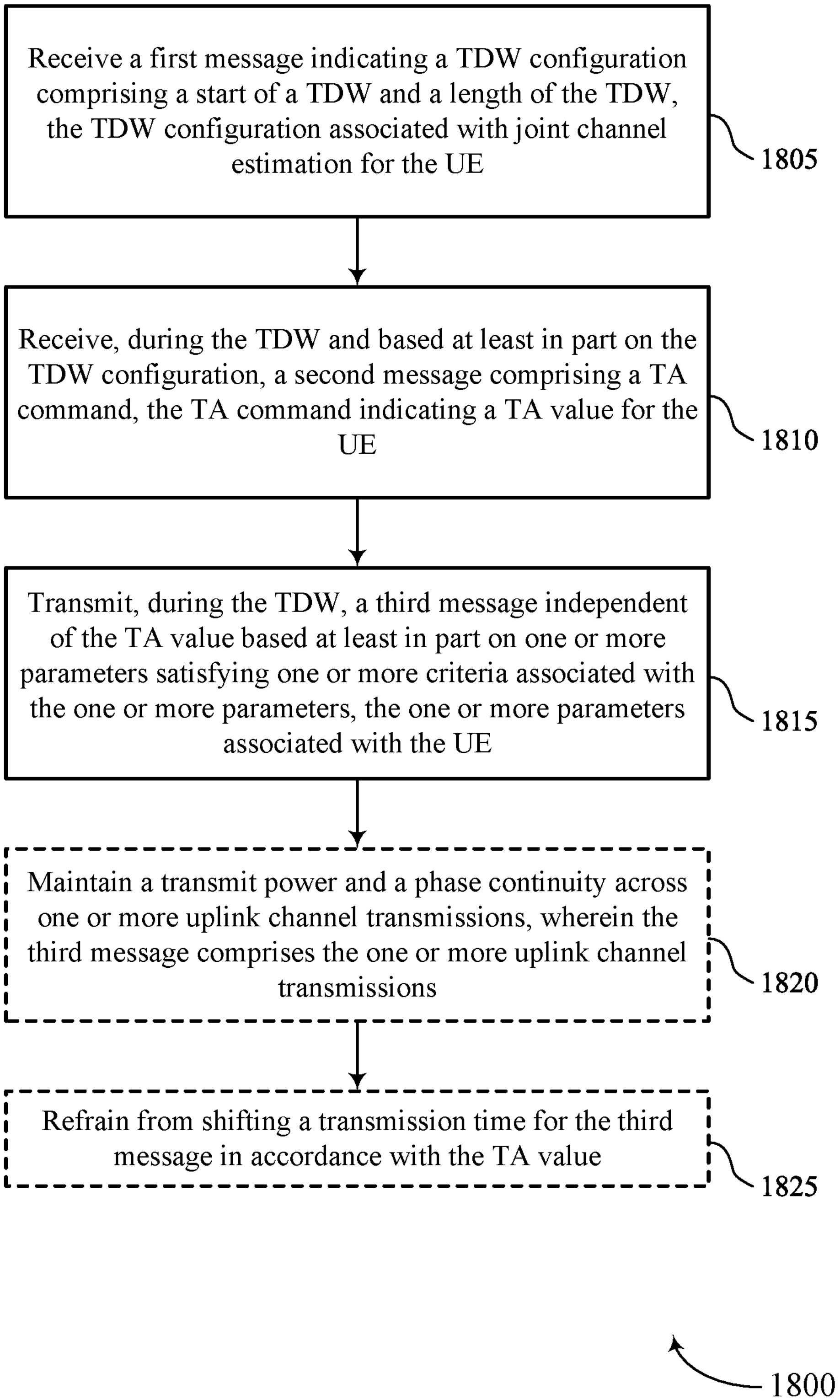

FIG. 18 shows a flowchart illustrating a method 1800 that supports priority-based TA adjustment in accordance with one or more aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1805, the method may include receiving a first message indicating a TDW configuration including a start of a TDW and a length of the TDW, the TDW configuration associated with joint channel estimation for the UE. The operations of 1805 may be performed in accordance with examples as disclosed herein. In some examples, aspects of the operations of 1805 may be performed by a TDW configuration component 825 as described with reference to FIG. 8.

At 1810, the method may include receiving, during the TDW and based on the TDW configuration, a second message including a TA command, the TA command indicating a TA value for the UE. The operations of 1810 may be performed in accordance with examples as disclosed herein. In some examples, aspects of the operations of 1810 may be performed by a TA command component 830 as described with reference to FIG. 8.

At 1815, the method may include transmitting, during the TDW, a third message independent of the TA value based on one or more parameters satisfying one or more criteria associated with the one or more parameters, the one or more parameters associated with the UE. The operations of 1815 may be performed in accordance with examples as disclosed herein. In some examples, aspects of the operations of 1815 may be performed by a joint channel estimation component 840 as described with reference to FIG. 8.

At 1820, the method may include maintaining a transmit power and a phase continuity across one or more uplink channel transmissions, where the third message includes the one or more uplink channel transmissions. The operations of 1820 may be performed in accordance with examples as disclosed herein. In some examples, aspects of the operations of 1820 may be performed by a joint channel estimation component 840 as described with reference to FIG. 8.

At 1825, the method may include refraining from shifting a transmission time for the third message in accordance with the TA value. The operations of 1825 may be performed in accordance with examples as disclosed herein. In some examples, aspects of the operations of 1825 may be performed by a TA component 835 as described with reference to FIG. 8.

Figure 19:
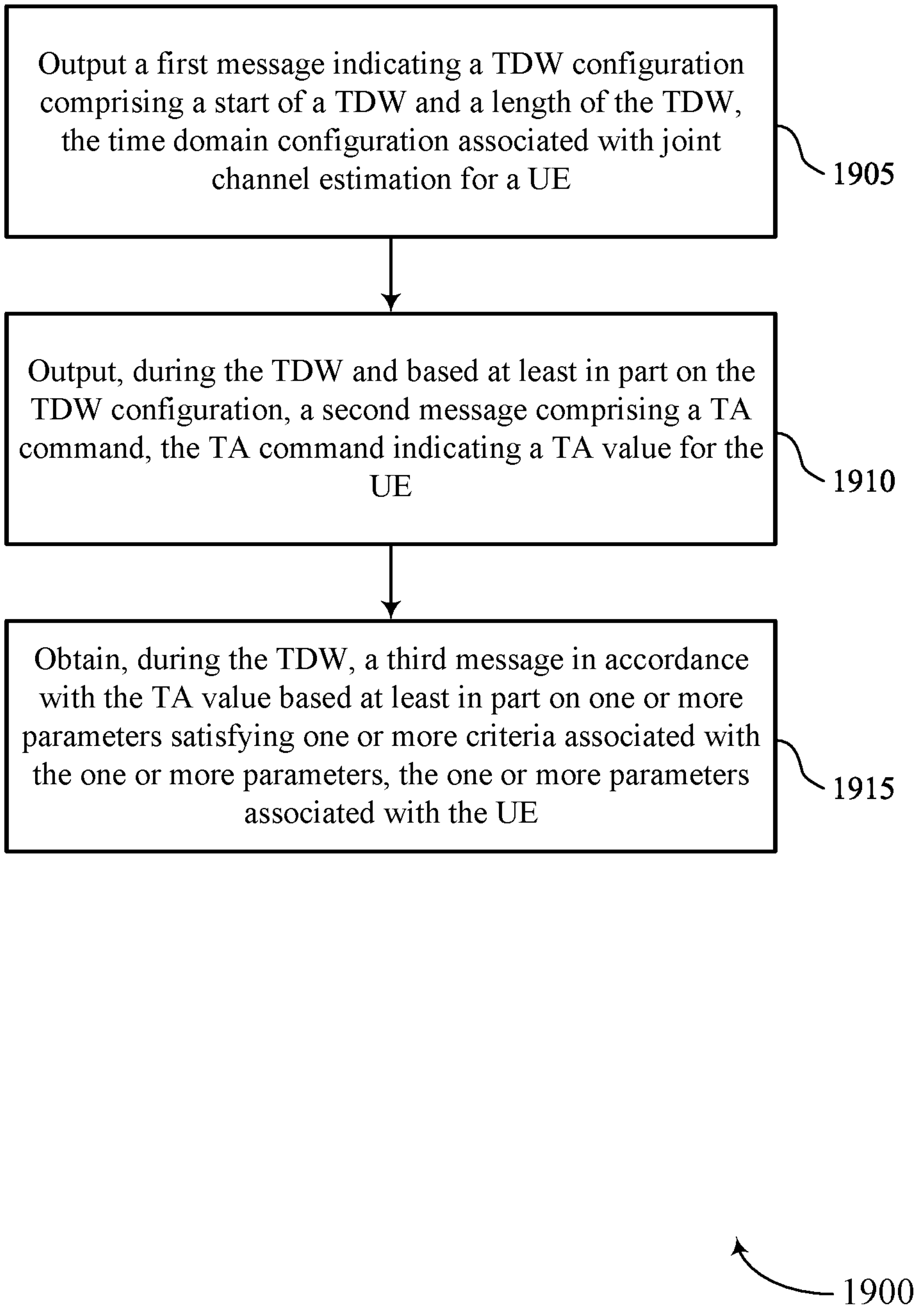

FIG. 19 shows a flowchart illustrating a method 1900 that supports priority-based TA adjustment in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include outputting a first message indicating a TDW configuration including a start of a TDW and a length of the TDW, the TDW configuration associated with joint channel estimation for a UE. The operations of 1905 may be performed in accordance with examples as disclosed herein. In some examples, aspects of the operations of 1905 may be performed by a TDW configuration manager 1225 as described with reference to FIG. 12.

At 1910, the method may include outputting, during the TDW and based on the TDW configuration, a second message including a TA command, the TA command indicating a TA value for the UE. The operations of 1910 may be performed in accordance with examples as disclosed herein. In some examples, aspects of the operations of 1910 may be performed by a TA command manager 1230 as described with reference to FIG. 12.

At 1915, the method may include obtaining, during the TDW, a third message in accordance with the TA value based on one or more parameters satisfying one or more criteria associated with the one or more parameters, the one or more parameters associated with the UE. The operations of 1915 may be performed in accordance with examples as disclosed herein. In some examples, aspects of the operations of 1915 may be performed by a TA manager 1235 as described with reference to FIG. 12.

Figure 20:
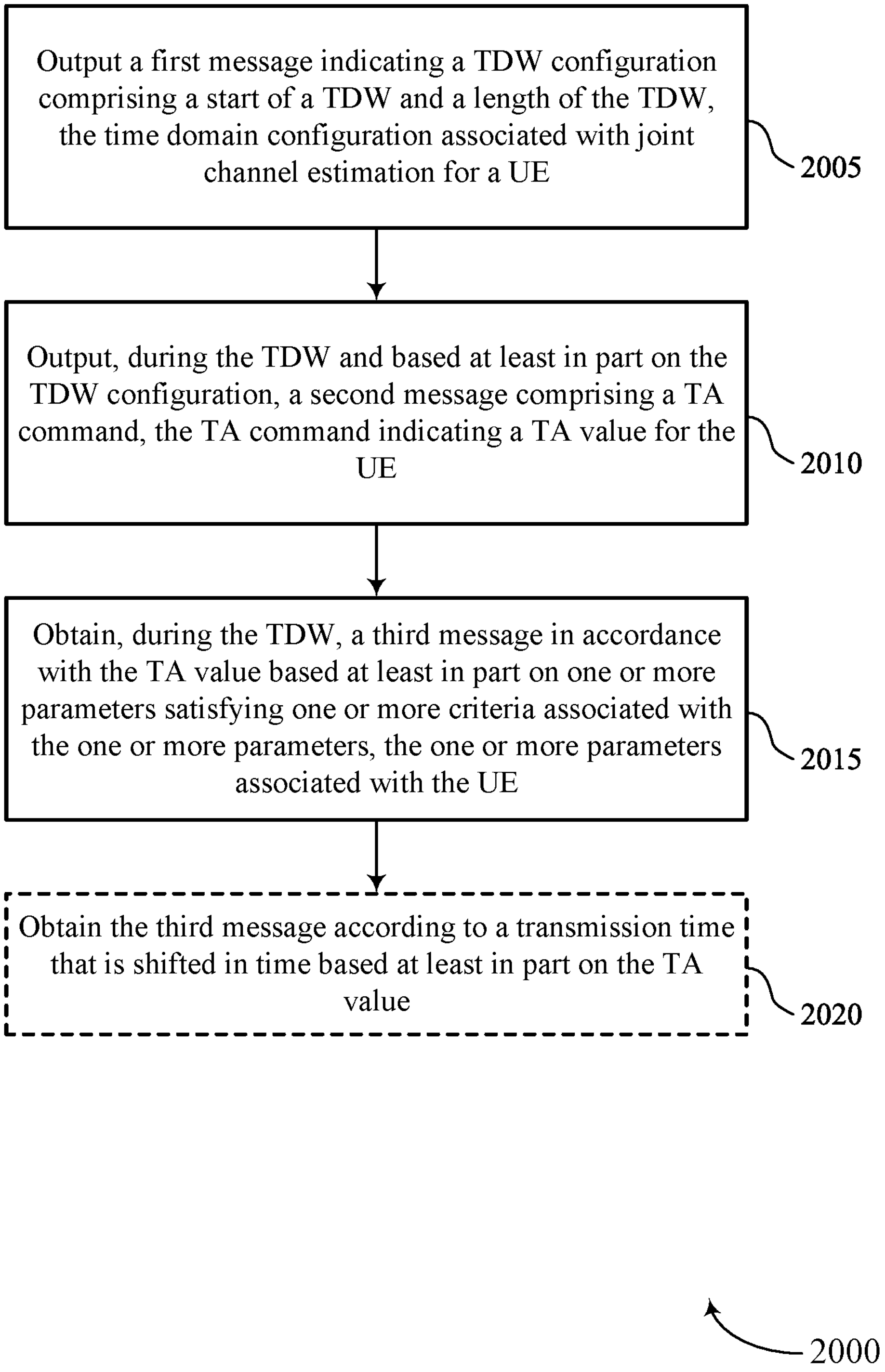

FIG. 20 shows a flowchart illustrating a method 2000 that supports priority-based TA adjustment in accordance with one or more aspects of the present disclosure. The operations of the method 2000 may be implemented by a network entity or its components as described herein. For example, the operations of the method 2000 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2005, the method may include outputting a first message indicating a TDW configuration including a start of a TDW and a length of the TDW, the TDW configuration associated with joint channel estimation for a UE. The operations of 2005 may be performed in accordance with examples as disclosed herein. In some examples, aspects of the operations of 2005 may be performed by a TDW configuration manager 1225 as described with reference to FIG. 12.

At 2010, the method may include outputting, during the TDW and based on the TDW configuration, a second message including a TA command, the TA command indicating a TA value for the UE. The operations of 2010 may be performed in accordance with examples as disclosed herein. In some examples, aspects of the operations of 2010 may be performed by a TA command manager 1230 as described with reference to FIG. 12.

At 2015, the method may include obtaining, during the TDW, a third message in accordance with the TA value based on one or more parameters satisfying one or more criteria associated with the one or more parameters, the one or more parameters associated with the UE. The operations of 2015 may be performed in accordance with examples as disclosed herein. In some examples, aspects of the operations of 2015 may be performed by a TA manager 1235 as described with reference to FIG. 12.

At 2020, the method may include obtaining the third message according to a transmission time that is shifted in time based on the TA value. The operations of 2020 may be performed in accordance with examples as disclosed herein. In some examples, aspects of the operations of 2020 may be performed by a TA manager 1235 as described with reference to FIG. 12.

Figure 21:
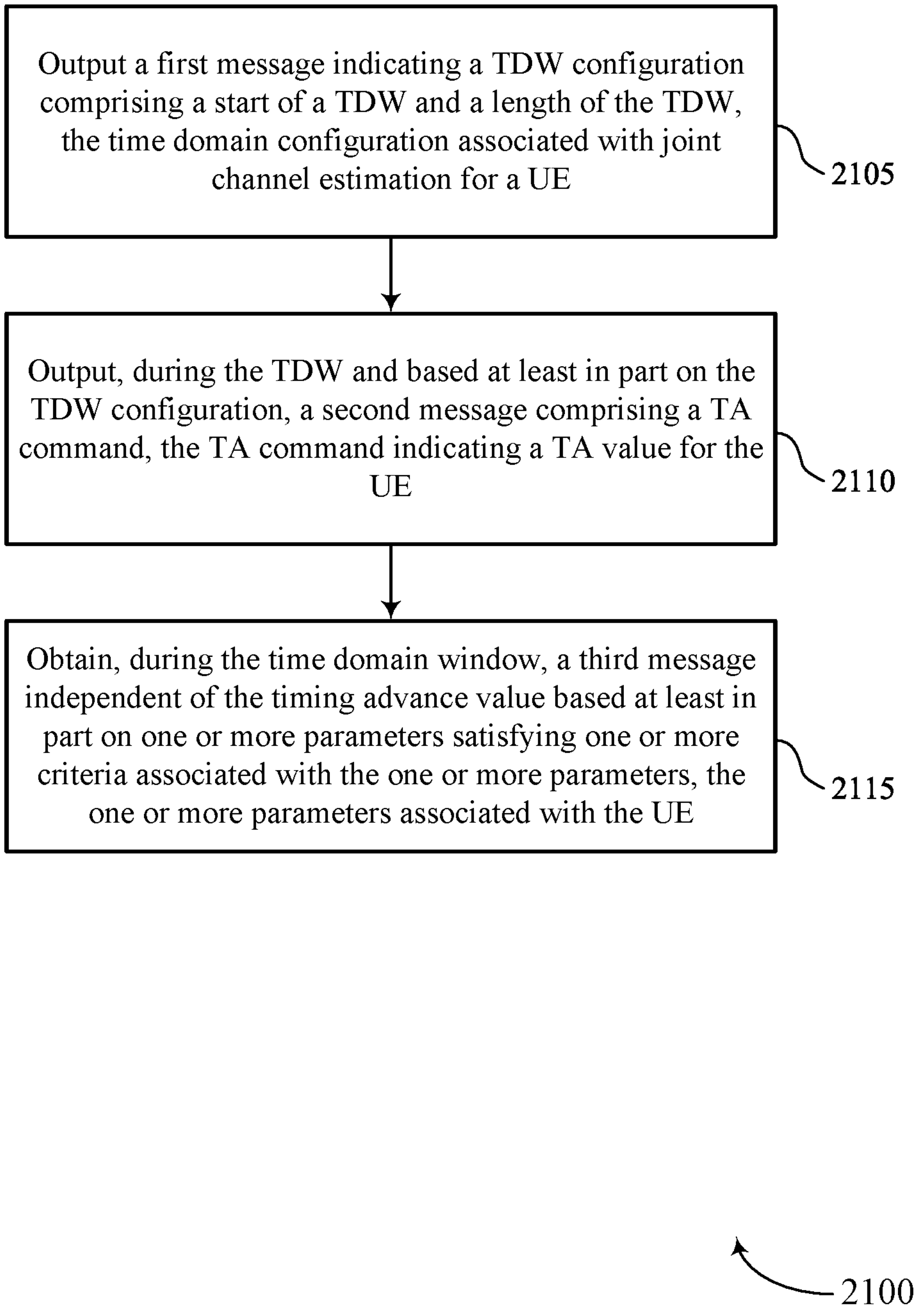

FIG. 21 shows a flowchart illustrating a method 2100 that supports priority-based TA adjustment in accordance with one or more aspects of the present disclosure. The operations of the method 2100 may be implemented by a network entity or its components as described herein. For example, the operations of the method 2100 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2105, the method may include outputting a first message indicating a TDW configuration including a start of a TDW and a length of the TDW, the TDW configuration associated with joint channel estimation for a UE. The operations of 2105 may be performed in accordance with examples as disclosed herein. In some examples, aspects of the operations of 2105 may be performed by a TDW configuration manager 1225 as described with reference to FIG. 12.

At 2110, the method may include outputting, during the TDW and based on the TDW configuration, a second message including a TA command, the TA command indicating a TA value for the UE. The operations of 2110 may be performed in accordance with examples as disclosed herein. In some examples, aspects of the operations of 2110 may be performed by a TA command manager 1230 as described with reference to FIG. 12.

At 2115, the method may include obtaining, during the TDW, a third message independent of the TA value based on one or more parameters satisfying one or more criteria associated with the one or more parameters, the one or more parameters associated with the UE. The operations of 2115 may be performed in accordance with examples as disclosed herein. In some examples, aspects of the operations of 2115 may be performed by a joint channel estimation manager 1240 as described with reference to FIG. 12.

Figure 22:
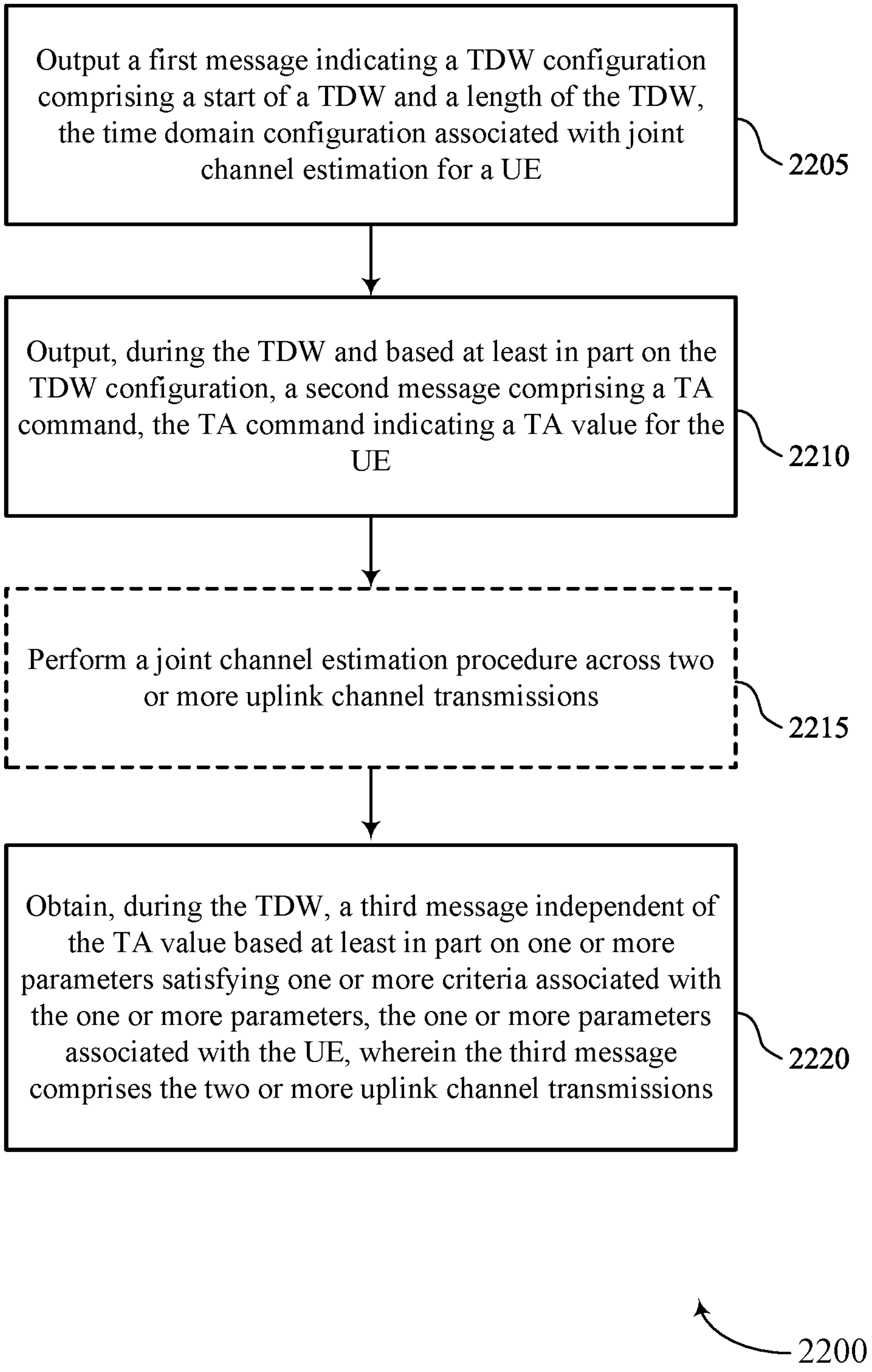

FIG. 22 shows a flowchart illustrating a method 2200 that supports priority-based TA adjustment in accordance with one or more aspects of the present disclosure. The operations of the method 2200 may be implemented by a network entity or its components as described herein. For example, the operations of the method 2200 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2205, the method may include outputting a first message indicating a TDW configuration including a start of a TDW and a length of the TDW, the TDW configuration associated with joint channel estimation for a UE. The operations of 2205 may be performed in accordance with examples as disclosed herein. In some examples, aspects of the operations of 2205 may be performed by a TDW configuration manager 1225 as described with reference to FIG. 12.

At 2210, the method may include outputting, during the TDW and based on the TDW configuration, a second message including a TA command, the TA command indicating a TA value for the UE. The operations of 2210 may be performed in accordance with examples as disclosed herein. In some examples, aspects of the operations of 2210 may be performed by a TA command manager 1230 as described with reference to FIG. 12.

At 2215, the method may include performing a joint channel estimation procedure across two or more uplink channel transmissions, where the third message includes the two or more uplink channel transmissions. The operations of 2215 may be performed in accordance with examples as disclosed herein. In some examples, aspects of the operations of 2215 may be performed by a joint channel estimation manager 1240 as described with reference to FIG. 12.

At 2220, the method may include obtaining, during the TDW, a third message independent of the TA value based on one or more parameters satisfying one or more criteria associated with the one or more parameters, the one or more parameters associated with the UE. The operations of 2220 may be performed in accordance with examples as disclosed herein. In some examples, aspects of the operations of 2220 may be performed by a joint channel estimation manager 1240 as described with reference to FIG. 12.

The following provides an overview of aspects of the present disclosure:

Aspect 1: A method for wireless communication at a UE, comprising: receiving a first message indicating a time domain window configuration comprising a start of a time domain window and a length of the time domain window, the time domain window configuration associated with joint channel estimation for the UE; receiving, during the time domain window and based at least in part on the time domain window configuration, a second message comprising a timing advance command, the timing advance command indicating a timing advance value for the UE; and transmitting, during the time domain window, a third message in accordance with the timing advance value based at least in part on one or more parameters satisfying one or more criteria associated with the one or more parameters, the one or more parameters associated with the UE.

Aspect 2: The method of aspect 1, the transmitting the third message comprising: transmitting the third message according to a transmission time that is shifted in time based at least in part on the timing advance value.

Aspect 3: The method of any of aspects 1 through 2, further comprising: receiving a control message indicating the one or more criteria, wherein the third message is transmitted based at least in part on the control message.

Aspect 4: The method of aspect 3, the receiving the control message comprising: receiving a radio resource control message, a medium access control-control element, or downlink control information.

Aspect 5: The method of any of aspects 1 through 4, wherein the one or more parameters comprise the timing advance value; and the one or more criteria comprise a timing advance threshold.

Aspect 6: The method of any of aspects 1 through 5, wherein the one or more parameters comprise an elevation angle between the UE and a network entity; and the one or more criteria comprise an elevation angle threshold.

Aspect 7: The method of any of aspects 1 through 6, wherein the one or more parameters comprise a duration of the time domain window; and the one or more criteria comprise a time domain window threshold duration.

Aspect 8: The method of any of aspects 1 through 7, further comprising: measuring a reference signal receive power associated with one or more reference signals; and transmitting, prior to the time domain window, a report comprising the measured reference signal receive power wherein the one or more parameters comprise the measured reference signal receive power.

Aspect 9: The method of any of aspects 1 through 7, further comprising: measuring a reference signal receive power associated with one or more reference signals; and transmitting, prior to the time domain window, a report comprising the measured reference signal receive power wherein the one or more criteria comprise a reference signal receive power threshold.

Aspect 10: The method of any of aspects 1 through 9, wherein the one or more parameters comprise a cell type; and the one or more criteria comprise one or more cell types comprising the cell type.

Aspect 11: The method of any of aspects 1 through 10, wherein the UE is operating in a non-terrestrial network.

Aspect 12: A method for wireless communication at a UE, comprising: receiving a first message indicating a time domain window configuration comprising a start of a time domain window and a length of the time domain window, the time domain window configuration associated with joint channel estimation for the UE; receiving, during the time domain window and based at least in part on the time domain window configuration, a second message comprising a timing advance command, the timing advance command indicating a timing advance value for the UE; and transmitting, during the time domain window, a third message independent of the timing advance value based at least in part on one or more parameters satisfying one or more criteria associated with the one or more parameters, the one or more parameters associated with the UE.

Aspect 13: The method of aspect 12, the transmitting the third message independent of the timing advance value comprising: maintaining a transmit power, a phase continuity, or both across one or more uplink channel transmissions, wherein the third message comprises the one or more uplink channel transmissions; and refraining from shifting a transmission time for the third message in accordance with the timing advance value.

Aspect 14: The method of any of aspects 12 through 13, further comprising: receiving a control message indicating the one or more criteria, wherein the third message is transmitted based at least in part on the control message.

Aspect 15: The method of aspect 14, the receiving the control message comprising: receiving a system information block message, downlink control information, a medium access control-control element, or a radio resource control message.

Aspect 16: The method of any of aspects 12 through 15, wherein the one or more parameters comprise the timing advance value; and the one or more criteria comprise a timing advance threshold.

Aspect 17: The method of any of aspects 12 through 16, wherein the one or more parameters comprise an elevation angle between the UE and a network entity; and the one or more criteria comprise an elevation angle threshold.

Aspect 18: The method of any of aspects 12 through 17, wherein the one or more parameters comprise a duration of the time domain window; and the one or more criteria comprise a time domain window threshold duration.

Aspect 19: The method of any of aspects 12 through 18, further comprising: measuring a reference signal receive power associated with one or more reference signals; and transmitting, prior to the time domain window, a report comprising the measured reference signal receive power wherein the one or more parameters comprise the measured reference signal receive power.

Aspect 20: The method of any of aspects 12 through 18, further comprising: measuring a reference signal receive power associated with one or more reference signals; and transmitting, prior to the time domain window, a report comprising the measured reference signal receive power wherein the one or more criteria comprise a reference signal receive power threshold.

Aspect 21: The method of any of aspects 12 through 20, wherein the one or more parameters comprise a cell type; and the one or more criteria comprise one or more cell types comprising the cell type.

Aspect 22: The method of any of aspects 12 through 21, wherein the UE is operating in a non-terrestrial network.

Aspect 23: A method for wireless communication at a network entity, comprising: outputting a first message indicating a time domain window configuration comprising a start of a time domain window and a length of the time domain window, the time domain configuration associated with joint channel estimation for a UE; outputting, during the time domain window and based at least in part on the time domain window configuration, a second message comprising a timing advance command, the timing advance command indicating a timing advance value for the UE; and obtaining, during the time domain window, a third message in accordance with the timing advance value based at least in part on one or more parameters satisfying one or more criteria associated with the one or more parameters, the one or more parameters associated with the UE.

Aspect 24: The method of aspect 23, the obtaining the third message comprising: obtaining the third message according to a transmission time that is shifted in time based at least in part on the timing advance value.

Aspect 25: The method of any of aspects 23 through 24, further comprising: outputting a control message indicating the one or more criteria, wherein the third message is obtained based at least in part on the control message.

Aspect 26: The method of aspect 25, the outputting the control message comprising: outputting a radio resource control message, a medium access control-control element, or downlink control information.

Aspect 27: The method of any of aspects 23 through 26, wherein the one or more parameters comprise the timing advance value; and the one or more criteria comprise a timing advance threshold.

Aspect 28: The method of any of aspects 23 through 27, wherein the one or more parameters comprise an elevation angle between the UE and the network entity; and the one or more criteria comprise an elevation angle threshold.

Aspect 29: The method of any of aspects 23 through 28, wherein the one or more parameters comprise a duration of the time domain window; and the one or more criteria comprise a time domain window threshold duration.

Aspect 30: The method of any of aspects 23 through 29, further comprising: obtaining, prior to the time domain window, a report comprising a measured reference signal receive power wherein: the one or more parameters comprise the measured reference signal receive power; and the one or more criteria comprise a reference signal receive power threshold.

Aspect 31: The method of any of aspects 23 through 30, wherein the one or more parameters comprise a cell type; and the one or more criteria comprise one or more cell types comprising the cell type.

Aspect 32: The method of any of aspects 23 through 31, wherein the network entity is operating in a non-terrestrial network.

Aspect 33: A method for wireless communication at a network entity, comprising: outputting a first message indicating a time domain window configuration comprising a start of a time domain window and a length of the time domain window, the time domain window configuration associated with joint channel estimation for a UE; outputting, during the time domain window and based at least in part on the time domain window configuration, a second message comprising a timing advance command, the timing advance command indicating a timing advance value for the UE; and obtaining, during the time domain window, a third message independent of the timing advance value based at least in part on one or more parameters satisfying one or more criteria associated with the one or more parameters, the one or more parameters associated with the UE.

Aspect 34: The method of aspect 33, the obtaining the third message independent of the timing advance value comprising: performing a joint channel estimation procedure across two or more uplink channel transmissions, wherein the third message comprises the two or more uplink channel transmissions.

Aspect 35: The method of any of aspects 33 through 34, further comprising: outputting a control message indicating the one or more criteria, wherein the third message is received based at least in part on the control message.

Aspect 36: The method of aspect 35, the outputting the control message comprising: outputting a system information block message, downlink control information, a medium access control-control element, or a radio resource control message.

Aspect 37: The method of any of aspects 33 through 36, wherein the one or more parameters comprise the timing advance value; and the one or more criteria comprise a timing advance threshold.

Aspect 38: The method of any of aspects 33 through 37, wherein the one or more parameters comprise an elevation angle between the UE and the network entity; and the one or more criteria comprise an elevation angle threshold.

Aspect 39: The method of any of aspects 33 through 38, wherein the one or more parameters comprise a duration of the time domain window; and the one or more criteria comprise a time domain window threshold duration.

Aspect 40: The method of any of aspects 33 through 39, further comprising: obtaining, prior to the time domain window, a report comprising a measured reference signal receive power wherein: the one or more parameters comprise the measured reference signal receive power; and the one or more criteria comprise a reference signal receive power threshold.

Aspect 41: The method of any of aspects 33 through 40, wherein the one or more parameters comprise a cell type; and the one or more criteria comprise one or more cell types comprising the cell type.

Aspect 42: The method of any of aspects 33 through 41, wherein the network entity is operating in a non-terrestrial network.

Aspect 43: An apparatus for wireless communication at a UE, comprising a processor and memory coupled with the processor, the processor configured to perform a method of any of aspects 1 through 11.

Aspect 44: An apparatus for wireless communication at a UE, comprising at least one means for performing a method of any of aspects 1 through 11.

Aspect 45: A non-transitory computer-readable medium storing code for wireless communication at a UE, the code comprising instructions executable by a processor to perform a method of any of aspects 1 through 11.

Aspect 46: An apparatus for wireless communication at a UE, a processor and memory coupled with the processor, the processor configured to perform a method of any of aspects 12 through 22.

Aspect 47: An apparatus for wireless communication at a UE, comprising at least one means for performing a method of any of aspects 12 through 22.

Aspect 48: A non-transitory computer-readable medium storing code for wireless communication at a UE, the code comprising instructions executable by a processor to perform a method of any of aspects 12 through 22.

Aspect 49: An apparatus for wireless communication at a network entity, comprising a processor and memory coupled with the processor, the processor configured to perform a method of any of aspects 23 through 32.

Aspect 50: An apparatus for wireless communication at a network entity, comprising at least one means for performing a method of any of aspects 23 through 32.

Aspect 51: A non-transitory computer-readable medium storing code for wireless communication at a network entity, the code comprising instructions executable by a processor to perform a method of any of aspects 23 through 32.

Aspect 52: An apparatus for wireless communication at a network entity, comprising a processor and memory coupled with the processor, the processor configured to perform a method of any of aspects 33 through 42.

Aspect 53: An apparatus for wireless communication at a network entity, comprising at least one means for performing a method of any of aspects 33 through 42.

Aspect 54: A non-transitory computer-readable medium storing code for wireless communication at a network entity, the code comprising instructions executable by a processor to perform a method of any of aspects 33 through 42.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
- one or more memories; and
- one or more processors coupled with the one or more memories and configured to cause the UE to:
  - receive a first message that indicates a time domain window configuration comprising a start of a time domain window and a length of the time domain window, the time domain window configuration associated with joint channel estimation for the UE;
  - measure a reference signal receive power associated with one or more reference signals;
  - receive, during the time domain window and based at least in part on the time domain window configuration, a second message comprising a timing advance command, wherein the timing advance command indicates a timing advance value for the UE; and
  - transmit, during the time domain window, a third message in accordance with the timing advance value based at least in part on satisfaction of one or more criteria by one or more parameters associated with the UE, wherein the one or more parameters comprise the measured reference signal receive power, and wherein the one or more criteria comprise a reference signal receive power threshold.

2. The apparatus of claim 1, wherein, to transmit the third message, the one or more processors are configured to cause the UE to:
- transmit the third message according to a transmission time that is shifted in time based at least in part on the timing advance value.

3. The apparatus of claim 1, wherein the one or more processors are further configured to cause the UE to:

receive a control message that indicates the one or more criteria, wherein the third message is transmitted based at least in part on the control message.

4. The apparatus of claim 3, wherein, to receive the control message, the one or more processors are configured to cause the UE to:

receive a radio resource control message, a medium access control-control element, or downlink control information.

5. The apparatus of claim 1, wherein:

the one or more parameters comprise the timing advance value; and the one or more criteria comprise a timing advance threshold.

6. The apparatus of claim 1, wherein:

the one or more parameters comprise an elevation angle between the UE and a network entity; and the one or more criteria comprise an elevation angle threshold.

7. The apparatus of claim 1, wherein:

the one or more parameters comprise a duration of the time domain window; and the one or more criteria comprise a time domain window threshold duration.

8. The apparatus of claim 1 further comprising one or more antennas, wherein the one or more processors are further configured to cause the UE to:

transmit, prior to the time domain window, a report comprising the measured reference signal receive power.

9. The apparatus of claim 1, wherein:

the one or more parameters comprise a cell type; and the one or more criteria comprise one or more cell types comprising the cell type.

10. The apparatus of claim 1, wherein the UE operates in a non-terrestrial network.

11. An apparatus for wireless communication at a user equipment (UE), comprising:

one or more memories; and one or more processors coupled with the one or more memories and configured to cause the UE to:

receive a first message that indicates a time domain window configuration comprising a start of a time domain window and a length of the time domain window, the time domain window configuration associated with joint channel estimation for the UE;

measure a reference signal receive power associated with one or more reference signals;

receive, during the time domain window and based at least in part on the time domain window configuration, a second message comprising a timing advance command, wherein the timing advance command indicates a timing advance value for the UE; and transmit, during the time domain window, a third message independent of the timing advance value based at least in part on satisfaction of one or more criteria by one or more parameters associated with the UE, wherein the one or more parameters comprise the measured reference signal receive power, and wherein the one or more criteria comprise a reference signal receive power threshold.

12. The apparatus of claim 11, wherein, to transmit the third message, the one or more processors are configured to cause the UE to:

maintain a transmit power, a phase continuity, or both across one or more uplink channel transmissions, wherein the third message comprises the one or more uplink channel transmissions; and refrain from shifting a transmission time for the third message in accordance with the timing advance value.

13. The apparatus of claim 11, wherein the one or more processors are further configured to cause the UE to:

receive a control message that indicates the one or more criteria, wherein the third message is transmitted based at least in part on the control message.

14. The apparatus of claim 13, wherein, to receive the control message, the one or more processors are configured to cause the UE to:

receive a system information block message, downlink control information, a medium access control-control element, or a radio resource control message.

15. The apparatus of claim 11, wherein:

the one or more parameters comprise the timing advance value; and the one or more criteria comprise a timing advance threshold.

16. The apparatus of claim 11, wherein:

the one or more parameters comprise an elevation angle between the UE and a network entity; and the one or more criteria comprise an elevation angle threshold.

17. The apparatus of claim 11, wherein:

the one or more parameters comprise a duration of the time domain window; and the one or more criteria comprise a time domain window threshold duration.

18. The apparatus of claim 11 further comprising one or more antennas, wherein the one or more processors are further configured to cause the UE to:

transmit, prior to the time domain window, a report comprising the measured reference signal receive power.

19. The apparatus of claim 11, wherein:

the one or more parameters comprise a cell type; and the one or more criteria comprise one or more cell types comprising the cell type.

20. The apparatus of claim 11, wherein the UE operates in a non-terrestrial network.

21. An apparatus for wireless communication at a network entity, comprising:

one or more memories; and one or more processors coupled with the one or more memories and configured to cause the network entity to:

output a first message that indicates a time domain window configuration comprising a start of a time domain window and a length of the time domain window, the time domain window configuration associated with joint channel estimation for a user equipment (UE);

output, during the time domain window and based at least in part on the time domain window configuration, a second message comprising a timing advance command, wherein the timing advance command indicates a timing advance value for the UE; and obtain, during the time domain window, a third message in accordance with the timing advance value based at least in part on satisfaction of one or more criteria by one or more parameters associated with the UE, wherein the one or more parameters comprise a measured reference signal receive power, and wherein the one or more criteria comprise a reference signal receive power threshold.

22. The apparatus of claim 21, wherein, to obtain the third message, the one or more processors are configured to cause the network entity to:

obtain the third message according to a transmission time that is shifted in time based at least in part on the timing advance value.

23. The apparatus of claim 21, wherein the one or more processors are further configured to cause the network entity to:

output a control message that indicates the one or more criteria, wherein the third message is obtained based at least in part on the control message.

24. The apparatus of claim 23, wherein, to output the control message, the one or more processors are configured to cause the UE to:

output a radio resource control message, a medium access control-control element, or downlink control information.

25. The apparatus of claim 21, wherein:

the one or more parameters comprise the timing advance value; and the one or more criteria comprise a timing advance threshold.

26. The apparatus of claim 21, wherein:

the one or more parameters comprise an elevation angle between the UE and the network entity; and the one or more criteria comprise an elevation angle threshold.

27. The apparatus of claim 21, wherein:

the one or more parameters comprise a duration of the time domain window; and the one or more criteria comprise a time domain window threshold duration.

28. The apparatus of claim 21 further comprising one or more antennas, wherein the one or more processors are further configured to cause the network entity to:

obtain, prior to the time domain window, a report comprising the measured reference signal receive power.

29. The apparatus of claim 21, wherein:

the one or more parameters comprise a cell type; and the one or more criteria comprise one or more cell types comprising the cell type.

30. An apparatus for wireless communication at a network entity, comprising:

one or more memories; and one or more processors coupled with the one or more memories and configured to cause the network entity to:

output a first message that indicates a time domain window configuration comprising a start of a time domain window and a length of the time domain window, the time domain window configuration associated with joint channel estimation for a user equipment (UE);

output, during the time domain window and based at least in part on the time domain window configuration, a second message comprising a timing advance command, wherein the timing advance command indicates a timing advance value for the UE; and obtain, during the time domain window, a third message independent of the timing advance value based at least in part on satisfaction of one or more criteria by one or more parameters associated with the UE, wherein the one or more parameters comprise a measured reference signal receive power, and wherein the one or more criteria comprise a reference signal receive power threshold.

31. The apparatus of claim 30, wherein, to obtain the third message independent of the timing advance value, the one or more processors are configured to cause the network entity to:

perform a joint channel estimation procedure across two or more uplink channel transmissions, wherein the third message comprises the two or more uplink channel transmissions.

32. The apparatus of claim 30, wherein the one or more processors are further configured to cause the network entity to:

output a control message that indicates the one or more criteria, wherein the third message is obtained based at least in part on the control message.

33. A method for wireless communications by a user equipment (UE), comprising:

receiving a first message indicating a time domain window configuration comprising a start of a time domain window and a length of the time domain window, the time domain window configuration associated with joint channel estimation for the UE;

measuring a reference signal receive power associated with one or more reference signals;

receiving, during the time domain window and based at least in part on the time domain window configuration, a second message comprising a timing advance command, the timing advance command indicating a timing advance value for the UE; and transmitting, during the time domain window, a third message in accordance with the timing advance value based at least in part on satisfaction of one or more criteria by one or more parameters associated with the UE, wherein the one or more parameters comprise the measured reference signal receive power, and wherein the one or more criteria comprise a reference signal receive power threshold.

34. The method of claim 33, the transmitting comprising:

transmitting the third message according to a transmission time that is shifted in time based at least in part on the timing advance value.

35. The method of claim 33, further comprising:

receiving a control message indicating the one or more criteria, wherein the third message is transmitted based at least in part on the control message.

36. A method for wireless communications by a user equipment (UE), comprising:

receiving a first message indicating a time domain window configuration comprising a start of a time domain window and a length of the time domain window, the time domain window configuration associated with joint channel estimation for the UE;

measuring a reference signal receive power associated with one or more reference signals;

receiving, during the time domain window and based at least in part on the time domain window configuration, a second message comprising a timing advance command, the timing advance command indicating a timing advance value for the UE; and transmitting, during the time domain window, a third message independent of the timing advance value based at least in part on satisfaction of one or more criteria by one or more parameters associated with the UE, wherein the one or more parameters comprise the measured reference signal receive power, and wherein the one or more criteria comprise a reference signal receive power threshold.

37. The method of claim 36, the transmitting comprising:

maintaining a transmit power, a phase continuity, or both across one or more uplink channel transmissions, wherein the third message comprises the one or more uplink channel transmissions; and refraining from shifting a transmission time for the third message in accordance with the timing advance value.

38. The method of claim 36, further comprising:

receiving a control message indicating the one or more criteria, wherein the third message is transmitted based at least in part on the control message.

39. A method for wireless communications by a network entity, comprising:

outputting a first message indicating a time domain window configuration comprising a start of a time domain window and a length of the time domain window, the time domain window configuration associated with joint channel estimation for a user equipment (UE);

outputting, during the time domain window and based at least in part on the time domain window configuration, a second message comprising a timing advance command, the timing advance command indicating a timing advance value for the UE; and obtaining, during the time domain window, a third message in accordance with the timing advance value based at least in part on satisfaction of one or more criteria by one or more parameters associated with the UE, wherein the one or more parameters comprise a measured reference signal receive power, and wherein the one or more criteria comprise a reference signal receive power threshold.

40. The method of claim 39, the obtaining comprising:

obtaining the third message according to a transmission time that is shifted in time based at least in part on the timing advance value.

41. The method of claim 39, further comprising:

outputting a control message indicating the one or more criteria, wherein the third message is obtained based at least in part on the control message.

42. A method for wireless communications by a network entity, comprising:

outputting a first message indicating a time domain window configuration comprising a start of a time domain window and a length of the time domain window, the time domain window configuration associated with joint channel estimation for a user equipment (UE);

outputting, during the time domain window and based at least in part on the time domain window configuration, a second message comprising a timing advance command, the timing advance command indicating a timing advance value for the UE; and obtaining, during the time domain window, a third message independent of the timing advance value based at least in part on satisfaction of one or more criteria by one or more parameters associated with the UE, wherein the one or more parameters comprise a measured reference signal receive power, and wherein the one or more criteria comprise a reference signal receive power threshold.

43. The method of claim 42, the obtaining comprising:

performing a joint channel estimation procedure across two or more uplink channel transmissions, wherein the third message comprises the two or more uplink channel transmissions.

44. The method of claim 42, further comprising:

outputting a control message indicating the one or more criteria, wherein the third message is obtained based at least in part on the control message.

* * * * *